US010003088B2

(12) United States Patent
Kakinuma et al.

(10) Patent No.: US 10,003,088 B2
(45) Date of Patent: Jun. 19, 2018

(54) SOLID OXIDE FUEL CELL STACK

(71) Applicant: TOTO LTD., Kitakyushu-shi, Fukuoka (JP)

(72) Inventors: Yasuo Kakinuma, Kanagawa-ken (JP); Osamu Okamoto, Kanagawa-ken (JP); Shigeru Ando, Kanagawa-ken (JP); Hironobu Murakami, Kanagawa-ken (JP); Seiki Furuya, Kanagawa-ken (JP); Yutaka Momiyama, Kanagawa-ken (JP); Kiyoshi Hayama, Kanagawa-ken (JP); Naoki Watanabe, Kanagawa-ken (JP); Shuhei Tanaka, Kanagawa-ken (JP); Nobuo Isaka, Kanagawa-ken (JP); Takuya Hoshiko, Kanagawa-ken (JP); Masaki Sato, Kanagawa-ken (JP)

(73) Assignee: Toto Ltd., Fukuoka (JP)

( * ) Notice: Subject to any disclaimer, the term of this patent is extended or adjusted under 35 U.S.C. 154(b) by 304 days.

(21) Appl. No.: 14/869,652

(22) Filed: Sep. 29, 2015

(65) Prior Publication Data
US 2016/0093897 A1     Mar. 31, 2016

(30) Foreign Application Priority Data

Sep. 30, 2014 (JP) ................................ 2014-202408
Sep. 30, 2014 (JP) ................................ 2014-202409
(Continued)

(51) Int. Cl.
*H01M 8/02* (2016.01)
*H01M 8/24* (2016.01)
(Continued)

(52) U.S. Cl.
CPC ....... *H01M 8/0202* (2013.01); *H01M 4/9033* (2013.01); *H01M 8/0217* (2013.01);
(Continued)

(58) Field of Classification Search
CPC .... H01M 8/02; H01M 8/0202; H01M 8/0236; H01M 8/24; H01M 8/241; H01M 8/2465;
(Continued)

(56) References Cited

U.S. PATENT DOCUMENTS 9,147,888 B2 * 9/2015 Liu ..................... H01M 8/0256

FOREIGN PATENT DOCUMENTS

JP     2008270203 A    11/2008
JP      5613808 B1    10/2014
(Continued)

OTHER PUBLICATIONS

Extended European Search Report corresponding to European Application No. EP 15 18 7531 dated Jan. 12, 2016.

*Primary Examiner* — Karie O'Neill Apicella
(74) *Attorney, Agent, or Firm* — Carrier Blackman & Associates, P.C.; Joseph P. Carrier; William D. Blackman

(57) ABSTRACT

A solid oxide fuel cell stack includes a support, a plurality of power generation elements provided on a surface of the support, the plurality of power generation elements connected in series, each including at least a fuel electrode, a solid electrolyte, and an air electrode stacked in that order, and an interconnector that electrically connects an air electrode in one of adjacent power generation elements to a fuel electrode in the other power generation element. A solid electrolyte in adjacent one power generation element is provided between a fuel electrode in the adjacent one power generation element and the fuel electrode in the adjacent other power generation element, and an insulating member is provided at a position that is on the solid electrolyte in the adjacent one power generation element and between the air electrode in the adjacent one power generation element and the solid electrolyte therein.

10 Claims, 9 Drawing Sheets

(30) Foreign Application Priority Data

Mar. 31, 2015 (JP) ................................ 2015-074372
Mar. 31, 2015 (JP) ................................ 2015-074373

(51) Int. Cl.
*H01M 8/12* (2016.01)
*H01M 8/10* (2016.01)
*H01M 8/00* (2016.01)
*H01M 8/0202* (2016.01)
*H01M 8/1246* (2016.01)
*H01M 8/243* (2016.01)
*H01M 8/2465* (2016.01)
*H01M 4/90* (2006.01)
*H01M 8/0217* (2016.01)
*H01M 8/124* (2016.01)

(52) U.S. Cl.
CPC ........... *H01M 8/1246* (2013.01); *H01M 8/24* (2013.01); *H01M 8/243* (2013.01); *H01M 8/2465* (2013.01); *H01M 2008/1293* (2013.01); *H01M 2300/0071* (2013.01)

(58) Field of Classification Search
CPC .... H01M 8/2425; H01M 8/12; H01M 8/1246; H01M 8/1286; H01M 8/10; H01M 8/1016; H01M 8/00; H01M 8/006
See application file for complete search history.

(56) References Cited

FOREIGN PATENT DOCUMENTS

| | | |
|---|---|---|
| JP | 2015064961 A | 4/2015 |
| JP | 2015065047 A | 4/2015 |
| WO | 03094268 A2 | 11/2003 |

\* cited by examiner

SOLID OXIDE FUEL CELL STACK

FIELD OF INVENTION

The present invention relates to a solid oxide fuel cell stack. More specifically, the present invention relates to a solid oxide fuel cell stack that can suppress the formation of a counter cell, has a high electrical conductivity, and has a excellent power generation performance.

BACKGROUND ART

Fuel cells are energy converters that, unlike heat engines which go through heat energy and kinetic energy processes, include reacting fuels such as natural gas and hydrogen with oxygen in the air through a solid electrolyte and continuously and directly obtaining electric energy from chemical energy possessed by fuels. Among them, solid oxide fuel cells are fuel cells that operate as cells including a solid oxide (ceramic) as a solid electrolyte, a fuel electrode as a negative electrode, and an air electrode as a positive electrode. Further, solid oxide fuel cells are known as having an advantage that a high energy conversion efficiency can be obtained.

In solid oxide fuel cells, the output per unit cell is so low that power generation is carried out by enhancing output through connection of a plurality of unit cells in series. Members through which adjacent unit cells are electrically connected are called "interconnectors." Interconnectors using ceramics as materials, hereinafter referred to also as "ceramic interconnectors", are known. Gas sealing properties high enough to prevent gas permeation, electrical conductivity, oxide ion insulating properties, and adhesion to solid electrolyte are required as properties of ceramic interconnectors.

In general, a ceramic interconnector cannot provide satisfactory electrical conductivity unless the thickness is small, for example, approximately not more than 100 μm. When an attempt is made to form a ceramic interconnector having a reduced small thickness so as to obtain satisfactory electrical conductivity on a surface of porous electrodes such as fuel electrodes and air electrodes, there is a possibility that the ceramic interconnector is disadvantageously incorporated into the porous electrode. This leads to a disadvantage of a possibility that the ceramic interconnector cannot be formed or a possibility that, even when the ceramic interconnector can be formed, the thickness is so small that satisfactory gas sealing properties cannot be obtained.

When the gas sealing property of the ceramic interconnector is low, the fuel gas is disadvantageously leaked from the fuel electrode side of the ceramic interconnector to the air electrode side, resulting in mixing with air. In order to enhance the gas sealing property of the ceramic interconnector, the denseness of the ceramic interconnector should be increased. To this end, the ceramic interconnector should be densely sintered. When the electrical conductivity of a ceramic interconnector is low, the resistance of the ceramic interconnector is so high that the output of the fuel cell is disadvantageously lowered. Further, when the oxide ion insulating property of a ceramic interconnector is low, the oxide ions are disadvantageously leaked from the air electrode side to the fuel electrode side of the interconnector, leading to a lowered efficiency of the fuel cell. In addition, when the adhesion between the solid electrolyte and the ceramic interconnector is low, disadvantageously, gaps such as cracking occur between the solid electrolyte and the ceramic interconnector, resulting in leakage of the fuel gas through the gaps.

Lanthanum chromite ($LaCrO_3$)-based interconnectors have widely been used as materials for the ceramic interconnector. It is known that the $LaCrO_3$-based interconnectors have a high electrical conductivity but cannot be sintered without difficulties. Further, since chromium (Cr) is contained, there is a possibility that the so-called Cr poisoning occurs.

Further, SLT-based interconnectors represented by $SrLaTiO_{3-\delta}$ have widely been used as materials for ceramic interconnectors. It is known that the SLT-based interconnectors have lower electrical conductivity but have better sinterability as compared with the $LaCrO_3$-based interconnectors. In the SLT-based interconnectors, for example, the electrical conductivity is developed by replacing Sr site in the crystal lattice of $SrTiO_3$, that is an insulator, with lanthanum (La) to give $SrLaTiO_{3-\delta}$ (SLT), thereby converting a part of $Ti^{4+}$ in Ti site in the crystal lattice of $SrLaTiO_{3-\delta}$ (SLT) to $Ti^{3+}$. $\delta$ is a value that is required to meet a neutral condition of the electric charge.

JP2008-270203A (PTL 1) aims to provide an SLT-based interconnector that simultaneously realize an improvement in electrical conductivity and an improvement in adhesion to an electrolyte layer while maintaining good airtightness. In order to realize this object, this patent literature describes that the ceramic interconnector has a two-layer structure of an airtightness-oriented portion formed on the fuel electrode side and an electrical conductivity-oriented portion that is formed on the air electrode side and has a higher electrical conductivity than the airtightness-oriented portion. Further, FIG. 2 in this literature shows that a solid electrolyte is formed between a fuel electrode in adjacent one power generation element and a fuel electrode in the adjacent other power generation element.

Nevertheless, when an air electrode 205 in adjacent one power generation element becomes close to a fuel electrode 302 in the adjacent other power generation element as in the conventional solid oxide fuel cell stack 280 illustrated in FIG. 8, oxide ions generated at the interface between the air electrode 205 and the solid electrolyte 204 in the one power generation element flow into the fuel electrode 302 in the other power generation element. This causes the formation of a counter cell that generates electromotive force in a direction opposite to electromotive force originally generated in the power generation element, leading to lowered power generation performance.

JP2015-064961A (PTL 2) describes a solid oxide fuel cell including: an insulative and ion-nonconductive first intermediate layer provided on a solid electrolyte in one power generation element and between an air electrode in one power generation element and a solid electrolyte in the one power generation element; and an insulative and ion-nonconductive second intermediate layer provided on a solid electrolyte in the other power generation element and between an air electrode in the one power generation element and the solid electrolyte in the other power generation element. Further, it is described that the first intermediate layer and the second intermediate layer may be in contact with an interconnector. PTL 2 describes that the solid oxide fuel cell can suppress the formation of a counter cell and can improve power generation performance.

In the solid oxide fuel cell described in PTL 2, however, since a part of the interconnector is covered with the solid electrolyte, a lowering in power generation performance cannot be effectively suppressed without difficulties.

Accordingly, a further improvement in the manufacture of a solid oxide fuel cell stack including power generation elements that can realize a high power generation output while suppressing the formation of a counter cell has been demanded.

CITATION LIST

Patent Literature

[PTL 1] JP2008-270203A
[PTL 2] JP2015-064961A

SUMMARY OF THE INVENTION

The present inventors have now found that the formation of a counter cell can be suppressed by providing, in a solid oxide fuel cell stack including a solid electrolyte provided between adjacent fuel electrodes, an insulating member on a solid electrolyte in adjacent one power generation element and between an air electrode in the adjacent one power generation element and the solid electrolyte therein. Further, the present inventors have found that a lowering in power generation performance can be effectively suppressed by covering the whole area of the surface of an interconnector with the air electrode in the one power generation element and that, as a result, a solid oxide fuel cell stack that has an excellent power generation performance, that is, a high power generation output, can be manufactured. The present invention has been made based on such findings.

Thus, an object of the present invention is to provide a solid oxide fuel cell stack that can suppress the formation of a counter cell, has a high electrical conductivity, and has a excellent power generation performance.

According to the present invention, there is provided a solid oxide fuel cell stack comprising at least:
  a support,
  a plurality of power generation elements provided on a surface of the support, the plurality of power generation elements each including at least a fuel electrode, a solid electrolyte, and an air electrode stacked in that order, and
  an interconnector that electrically connects an air electrode in one of adjacent power generation elements in the plurality of power generation elements to a fuel electrode in the other power generation element, the plurality of power generation elements being connected in series to each other, wherein
  a solid electrolyte in one power generation element is provided between a fuel electrode in the one power generation element and the fuel electrode in the other power generation element,
  an insulating member is provided at a position that is on the solid electrolyte in the one power generation element and between the air electrode in the one power generation element and the solid electrolyte therein,
  the insulating member is in contact with the interconnector, and
  the surface of the interconnector is covered with the air electrode in the one power generation element.

Specifically, the solid oxide fuel cell stack according to the present invention comprises:
  a support; and
  a plurality of power generation elements provided on a surface of the support, wherein
  when two adjacent power generation elements in the plurality of power generation elements are a first power generation element and a second power generation element, respectively,
  the first power generation element comprises, as constituent members,
    a first fuel electrode,
    a first air electrode, and
    a first solid electrolyte provided between the first fuel electrode and the first air electrode,
    the first fuel electrode being provided between the support and the first air electrode,
  the second power generation element comprises, as constituent members,
    a second fuel electrode,
    a second air electrode, and
    a second solid electrolyte provided between the second fuel electrode and the second air electrode,
    the second fuel electrode being provided between the support and the second air electrode,
  the solid oxide fuel cell stack further comprises an interconnector that electrically connects the first air electrode in the first power generation element to the second fuel electrode in the second power generation element,
  the first power generation element is connected in series with the second power generation element through the interconnector,
  when a vertical direction from the surface of the support to the first fuel electrode, the first solid electrolyte, and the first air electrode or a vertical direction from the surface of the support to the second fuel electrode, the second solid electrolyte, and the second air electrode is presumed to be a Z axis direction,
  the two adjacent power generation elements include
    a second area of the first power generation element, the second area including the first solid electrolyte and the first air electrode arranged in that order in the Z axis direction,
    a third area of the first power generation element, the third area including the first fuel electrode, the first solid electrolyte, and the first air electrode arranged in that order in the Z axis direction, and
    a sixth area of the first power generation element, the sixth area including the second fuel electrode, the interconnector, and the first air electrode arranged in that order in the Z axis direction,
  when a direction that is vertical to the Z axis direction and in which oxide ions migrate is presumed to be an X axis direction,
  the third area, the second area, and the sixth area are continuously adjacent in that order in the X axis direction, and
  the solid oxide fuel cell stack further includes an insulating member provided in contact with the interconnector, and the insulating member includes,
    in the second area, a first portion provided between the first solid electrolyte and the first air electrode, and
  the whole area of the surface of the interconnector is covered with the first air electrode.

DESCRIPTION OF THE INVENTION

Definition

The solid oxide fuel cell stack according to the present invention refers to a solid oxide fuel cell stack that, as long as the solid oxide fuel cell stack includes an insulating member and the arrangement of an interconnector and an air electrode meets a requirement described later, is usually classified or understood as a solid oxide fuel cell stack in the art. The solid oxide fuel cell stack includes at least a plurality of power generation elements each including at least a fuel electrode, a solid electrolyte, and an air electrode stacked in that order, and an interconnector that electrically connects an air electrode in one of the two adjacent power generation elements in the plurality of power generation elements to a fuel electrode in the other power generation element. The shape of the solid oxide fuel cell stack according to the present invention is not limited and may be, for example, a cylindrical shape or a hollow plate-like shape with a plurality of gas flow paths formed therein.

The expression "adjacent" or "provided adjacent" as used herein means that a plurality of contemplated elements do not include other contemplated element therebetween that is the same type as the contemplated element. Other elements other than the contemplated elements may be included between the contemplated elements. For example, an additional power generation element is not included between one of the adjacent power generation elements and the other power generation element. However, for example, an interconnector can be included between one of the adjacent power generation elements and the other power generation element.

The solid oxide fuel cell stack according to the present invention refers to a so-called horizontal-striped solid oxide fuel cell stack. In the present invention, a horizontal-striped solid oxide fuel cell refers to a solid oxide fuel cell including a plurality of power generation elements provided on a surface of one support.

In the present invention, the solid oxide fuel cell stack refers to an assembly of a plurality of power generation elements.

A solid oxide fuel cell system using a solid oxide fuel cell stack according to the present invention is not limited to a specific one, and publicly known manufacturing methods and other materials constituting the solid oxide fuel cell system may be used.

Figure 1A:
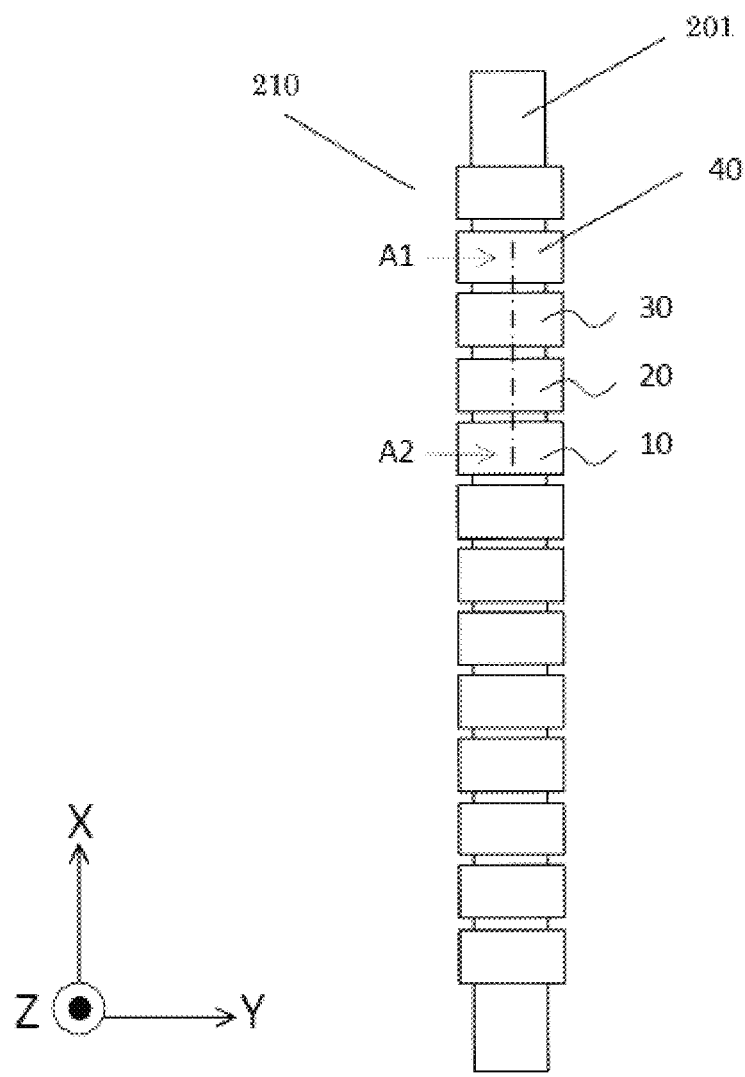
FIG. 1A is a front view of a horizontal-striped solid oxide fuel cell stack according to the present invention.
Figure 1B:
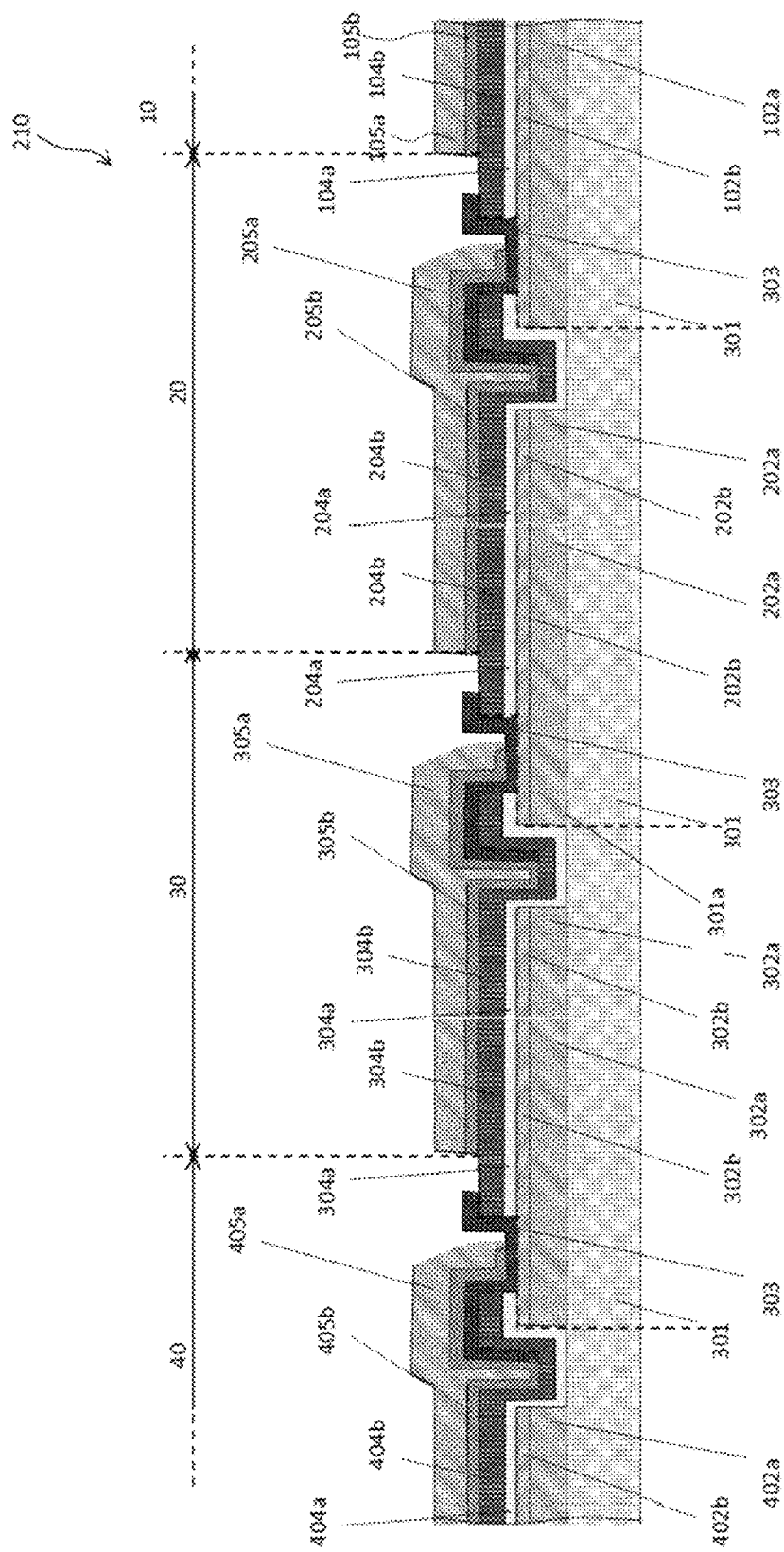
FIG. 1B is a cross-sectional schematic view of four adjacent power generation elements constituting a solid oxide fuel cell stack according to the present invention.

The whole construction and constituent elements of a solid oxide fuel cell stack will be described in reference to FIGS. 1A and 1B. FIG. 1A is a front view of a horizontal-striped solid oxide fuel cell stack as one embodiment of the present invention. FIG. 1B is a schematic view illustrating one embodiment of a solid oxide fuel cell stack 210 according to the present invention.

Power Generation Element

As shown in FIGS. 1A and 1B, a solid oxide fuel cell stack 210 according to the present invention includes a plurality of power generation elements (10, 20, 30, 40). These power generation elements (10, 20, 30, 40) are connected in series. Each of the power generation elements (10, 20, 30, 40) is a laminate of a fuel electrode (102, 202, 302, 402), a solid electrolyte (104, 204, 304, 404), and an air electrode (105, 205, 305, 405) stacked in that order.

In the present specification, a vertical direction, a stacking direction, from the surface of a support 301 towards a fuel electrode (102, 202, 302, 402), a solid electrolyte (104, 204, 304, 404), and an air electrode (105, 205, 305, 405) in each power generation element (10, 20, 30, 40) is defined as a Z-axis direction. One direction perpendicular to the Z-axis direction is defined as an X-axis direction, and a direction perpendicular to both the Z-axis direction and the X-axis direction is defined as a Y-axis direction. Here, the X-axis direction is a direction in which oxide ions move. As illustrated in FIGS. 1A and 1B, in the solid oxide fuel cell stack 210, the plurality of power generation elements (10, 20, 30, 40) are arranged along the X-axis direction.

Support

The solid oxide fuel cell stack 210 according to the present invention includes a support 201, 301. A plurality of power generation elements (10, 20, 30, 40) are provided in series on a surface of the support 201, 301. In the present invention, any type of support may be used without particular limitation as long as the support 201, 301 is porous, is permeable to gas, has a mechanical strength high enough to support the plurality of power generation elements (10, 20, 30, 40) and an electrical insulating property. At least one material selected from the group consisting of MgO, calcia-stabilized zirconia (CSZ), and forsterite may be used as materials for the support 201, 301. The thickness of the support 201, 301 is preferably 0.5 to 2 mm.

Inner Electrode and Outer Electrode

In the present invention, fuel electrodes (102, 202, 302, 402) may be inner electrodes or alternatively may be outer electrodes. That is, each of a plurality of the power generation elements (10, 20, 30, 40) may be a laminate including at least a fuel electrode (102, 202, 302, 402) as an inner electrode, a solid electrolyte (104, 204, 304, 404), and an air electrode (105, 205, 305, 405) as an outer electrode stacked on a surface of each other. Alternatively, each of a plurality of the power generation elements (10, 20, 30, 40) may be a laminate including at least an air electrode (105, 205, 305, 405) as an inner electrode, a solid electrolyte (104, 204, 304, 404), and a fuel electrode (102, 202, 302, 402) as an outer electrode stacked on a surface of each other.

In a preferred embodiment of the present invention, the inner electrode is a fuel electrode (102, 202, 302, 402). The reason for this is as follows. Specifically, a porous structure having good gas permeability is adopted in the support 201, 301 and current collecting layers (for example, fuel electrode layers 102a, 202a, 302a, 402a, the fuel electrode layers being described later in more detail). The support 201, 301 holds the structure of the power generation elements (10, 20, 30, 40). Accordingly, the thickness of the support 201, 301 is larger than that of the current collecting layer that is required to meet an electrical conductivity requirement. That is, the support 201, 301 is likely to have a lower permeability to gas than the current collecting layer. Further, a comparison of the diffusion rate of oxygen gas with that of hydrogen gas has revealed that the diffusion rate of hydrogen gas is a few times higher than that of oxygen gas. Thus, when the inner electrode is an air electrode (105, 205, 305, 405), oxygen having a lower permeability than hydrogen is permeated into the support, and, consequently, the gas diffusion overvoltage is larger than that when the inner electrode is a fuel electrode (102, 202, 302, 402). As a result, power generation performance is likely to be lowered. Accordingly, when the inner electrode is the fuel electrode (102, 202, 302, 402), a better power generation performance can be obtained. When the inner electrode is the fuel electrode (102, 202, 302, 402), the outer electrode is the air electrode (105, 205, 305, 405).

Fuel Electrode

In the present invention, the fuel electrode (102, 202, 302, 402) has porosity high enough to be permeable to fuel gas, catalytic activity (electrode activity) high enough to adsorb hydrogen, electrical conductivity, and oxide ion conductivity. The porosity of the fuel electrode (102, 202, 302, 402) may be smaller than that of the support 201.

For example, NiO/zirconium-containing oxides and NiO/cerium-containing oxides may be mentioned as materials for constituting the fuel electrode (102, 202, 302, 402), and at least any one of these materials is contained in the fuel electrode (102, 202, 302, 402). Here the NiO/zirconium-containing oxide refers to a homogeneous mixture of NiO and the zirconium-containing oxide at a predetermined ratio. The NiO/cerium-containing oxide refers to a homogeneous mixture of NiO and a cerium-containing oxide at a predetermined ratio. Zirconium-containing oxides of NiO/zirconium-containing oxides include, for example, zirconium-containing oxides doped with one or more of CaO, $Y_2O_3$, and $Sc_2O_3$. Cerium-containing oxides of NiO/cerium-containing oxides include compounds of general formula $Ce_{1-y}Ln_yO_2$ wherein Ln is one or more elements selected from La, Pr, Nd, Sm, Eu, Gd, Tb, Dy, Ho, Er, Tm, Yb, Lu, Sc, and Y; and $0.05 \leq y \leq 0.50$. NiO is reduced under a fuel atmosphere to Ni, and, thus, the oxides are converted to Ni/zirconium-containing oxides or Ni/cerium-containing oxides.

In the present invention, the fuel electrode (102, 202, 302, 402) may have a single-layer structure or a multi-layer structure. An example of the fuel electrode (102, 202, 302, 402) having a multi-layer structure as the inner electrode is a fuel electrode comprising a layer of Ni/YSZ, YSZ being yttria-stabilized zirconia, that is, a fuel electrode layer 102a, 202a, 302a, 402a) on the support side and a layer of Ni/GDC, GDC being $Gd_2O_3$—$CeO_2$, that is, a fuel electrode catalyst layer (102b, 202b, 302b, 402b) on the solid electrolyte side. The thickness of the fuel electrode (102, 202, 302, 402), that is, the total of the thickness of the fuel electrode layer and the thickness of the fuel electrode catalyst layer is preferably 10 to 200 μm. In this case, the thickness of the fuel electrode catalyst layer (102b, 202b, 302b, 402b) is preferably 0 to 30 μm.

Air Electrode

In the present invention, the air electrode (105, 205, 305, 405) has porosity high enough to be permeable to oxygen, catalytic activity, i.e., electrode activity, high enough to adsorb oxygen or to ionize oxygen, electrical conductivity, and oxide ion conductivity. The porosity and electrical conductivity of the air electrode (105, 205, 305, 405) each may be lower than those of the current collecting layer.

Materials that constitute air electrodes (105, 205, 305, 405) include, for example, lanthanum cobalt-based oxides such as $La_{1-x}Sr_xCoO_3$ wherein x=0.1 to 0.3, and $LaCo_{1-x}Ni_xO_3$ wherein x=0.1 to 0.6, and lanthanum ferrite-based oxides that are solid solutions composed of $LaSrFeO_3$-based compounds and $LaSrCoO_3$-based compounds such as $La_{1-m}Sr_mCo_{1-n}Fe_nO_3$ wherein $0.05<m<0.50$ and $0<n<1$. The air electrode (105, 205, 305, 405) may have a single-layer structure or a multi-layered structure. An example of an outer electrode that is an air electrode (105, 205, 305, 405) having a multi-layered structure is $La_{0.6}Sr_{0.4}Co_{0.2}Fe_{0.8}O_3$, that is, an air electrode catalyst layer 105b, 205b, 305b, 405b on the solid electrolyte side, and $La_{0.6}Sr_{0.4}Co_{0.8}Fe_{0.2}O_3$, that is, an air electrode layer 105a, 205a, 305a, 405a, on the uppermost layer. The thickness of the air electrode, that is, the total thickness of the air electrode layer and the thickness of the air electrode catalyst layer, is preferably 0.2 to 30 μm.

Solid Electrolyte

In the present invention, the solid electrolyte (104, 204, 304, 404) has oxide ion conductivity, gas sealing property, and electrical insulating properties. Materials that constitute the solid electrolyte (104, 204, 304, 404) include lanthanum gallate-based oxides and stabilized zirconia with one or more elements selected from Y, Ca, and Sc dissolved in solid solution as solid solution species. In the present invention, suitable solid electrolytes (104, 204, 304, 404) include lanthanum gallate-based oxides (LSGMs) doped with Sr and Mg, more preferably lanthanum gallate-based oxides (LS-GMs) represented by general formula $La_{1-a}Sr_aGa_{1-b-c}Mg_bCo_cO_{3-\delta}$ wherein $0.05 \leq a \leq 0.3$, $0<b<0.3$, and $0 \leq c \leq 0.15$; and δ is a value that is determined so as to meet charge neutralization conditions. LSGM develops oxide on conductivity, LSGM including $LaGaO_3$ as a base, La sites having been replaced with Sr. The solid electrolyte (104, 204, 304, 404) may have a single-layer structure or a multi-layered structure. When the solid electrolyte (104, 204, 304, 404) has a multi-layered structure, for example, a reaction inhibitory layer (104a, 204a, 304a, 404a) may be provided between the fuel electrode (102, 202, 302, 402) and the solid electrolyte layer (104b, 204b, 304b, 404b) formed of LSGM. Ceria with La dissolved in solid solution ($Ce_{1-x}La_xO_2$ wherein $0.3<x<0.5$), preferably $Ce_{0.6}La_{0.4}O_2$, may be mentioned as a specific example of the reaction inhibitory layer (104a, 204a, 304a, 404a). The thickness of the solid electrolyte (104, 204, 304, 404), that is, the total thickness of the solid electrolyte layer and the reaction inhibitory layer is preferably 5 to 60 μm. The thickness of the reaction inhibitory layer (104a, 204a, 304a, 404a) is preferably 0 to 20 μm.

Current Collecting Layer

The solid oxide fuel cell stack according to the present invention includes a current collecting layer that electrically connects the outer electrode to the interconnector. The current collecting layer has gas (oxygen) permeability and electrical conductivity high enough to realize smooth flow of electrons produced by the air electrode. In the present invention, when the outer electrode is an air electrode, the current collecting layer can be formed by baking an electrically conductive paste containing a noble metal such as Ag or Pt or a paste containing an electrically conductive oxide such as $La_{0.6}Sr_{0.4}Co_{0.8}Fe_{0.2}O_{3-\delta}$. When the outer electrode is a fuel electrode, the current collecting layer can be formed by baking a paste containing NiO or oxides of metals such as Ni that, when reduced, develop electrical conductivity, or metals. Preferably, the current collecting layer has a porous or mesh structure from the viewpoint of providing gas permeability. The thickness of the current collecting layer is preferably 10 to 200 μm.

Interconnector

Composition

The interconnector 303 included in the solid oxide fuel cell stack according to the present invention electrically connects an air electrode, for example, an air electrode 205, in one of two adjacent power generation elements in a plurality of power generation elements (10, 20, 30, 40) to a fuel electrode, for example, a fuel electrode 302, in the other power generation element. This interconnector 303 is preferably a ceramic interconnector formed of ceramic.

The interconnector 303 is preferably formed of a perovskite oxide represented by general formula $Sr_aLa_bTi_{1-c-d}A_cB_dO_{3-\delta}$ wherein A represents one or more elements selected from Nb, V, and Ta; B represents one or more elements selected from Fe and Co; and a, b, c, and d are a positive real number that satisfies $0.1 \leq a \leq 0.8$, $0.1 \leq b \leq 0.8$, $0.1 \leq c \leq 0.3$, and $0.3 \leq d \leq 0.6$. Here "formed of" means that the main component of the interconnector 303 is a perovskite oxide represented by the general formula $Sr_aLa_bTi_{1-c-d}A_cB_dO_{3-\delta}$. That is, an embodiment where the interconnector 303 contains other components, for example, diffusion elements described later is not excluded. In other words, preferably, the interconnector 303 contains as a main component a perovskite oxide represented by the general formula $Sr_aLa_bTi_{1-c-d}A_cB_dO_{3-\delta}$. The main component means that, in the interconnector 303, the content of the perovskite oxide represented by the general formula $Sr_xLa_yTiO_{3-\delta}$ is not less than 80% by mole, preferably not less than 90% by mole, more preferably not less than 95% by mole. Still more preferably, the interconnector 303 consists of the perovskite oxide only. The composition ratio between Sr and La preferably meets the requirement of $0.1 \leq a \leq 0.8$ and $0.1 \leq b \leq 0.8$ and the content of oxygen (3–δ) being not more than 3.00. When this requirement is met, a film having low porosity and high denseness can be obtained. Further, a stable perovskite structure can be maintained, an impurity phase such as $La_2Ti_2O_7$ is not produced, and poor denseness due to sintering inhibition does not occur.

In a preferred embodiment of the present invention, in the perovskite oxide represented by the above general formula, the composition ratio between Sr and La is configured such that the oxygen content is 2.95 to 3.00. When the oxygen content is not less than 2.95, a stable perovskite structure can be maintained, an impurity phase such as $TiO_2$ is not produced, and poor denseness due to sintering inhibition does not occur.

In a preferred embodiment of the present invention, in the perovskite oxide represented by the above general formula, the composition ratio between element A and element B is $0.1 \leq c \leq 0.3$ and $0.3 \leq d \leq 0.6$. The composition ratio of Ti is determined by 1−c−d.

In a preferred embodiment of the present invention, in the perovskite oxide represented by the above general formula, the composition ratio between Sr and La is $0.2 \leq a \leq 0.5$ and $0.4 \leq b \leq 0.7$. More preferably, the composition ratio is $0.29 \leq a \leq 0.4$ and $0.5 \leq b \leq 0.6$. When this requirement is met, an interconnector can be formed that has a low porosity and a high denseness.

In a preferred embodiment of the present invention, in the perovskite oxide represented by the above general formula, the composition ratio between the element A and the element B is $0.1 \leq c \leq 0.25$ and $0.3 \leq d \leq 0.5$.

In a more preferred embodiment of the present invention, in the perovskite oxide represented by the above general formula, the element A is Nb, and the element B is Fe. In this embodiment, in the interconnector 303, Ti site in SLT is replaced with Fe as an electrically conductive carrier, contributing to an improvement in electrical conductivity. In SLT replaced with Fe, when the Ti site is replaced with Fe, oxygen deficiency occurs, leading to a tendency that oxide ion conductivity is disadvantageously developed. In the interconnector 303 constituting the present invention, however, since the Ti site in SLT replaced with Fe is further replaced with pentavalent Nb having a higher valence than tetravalent Ti, the development of the oxide ion conductivity due to oxygen deficiency can be suppressed. That is, the electrical conductivity can be improved by replacing Ti site in SLT with Fe, and the development of the oxide ion conductivity can be suppressed by further replacing with Nb of Ti site in SLT replaced with Fe. Thus, an interconnector 303 can be obtained that can simultaneously realize electrical conductivity and oxide ion insulating property.

In the above embodiment, in the interconnector 303, the composition ratio of Fe is regulated in a specific range. That is, the composition ratio of Fe preferably meets the above-defined d range. When this requirement is met, good adhesion to the solid electrolyte and good electrical conductivity can be simultaneously realized while regulating the diffusion of elements into the solid electrolyte during firing. Further, the composition ratio between Nb and Fe is preferably in a specific range. That is, preferably, the composition ratio between Nb and Fe meets the above c and d range. By virtue of this, better adhesion to the solid electrolyte and electrical conductivity can be realized.

In the present invention, the interconnector 303 may contain as unavoidable components elements that are, for example, in firing, diffused into the interconnector 303 from other members, that is, for example, the fuel electrode, the air electrode, and the solid electrolyte. Such elements include, for example, Ni, Y, Gd, Ce, Zr, La, Sr, Ga, Mg, Co, and Fe. The amount of elements diffused may vary depending, for example, upon constituent materials for each member, crystal structure, firing temperature, and mode of firing, for example, successive firing or co-firing.

Porosity

In the present invention, the porosity of the interconnector 303 is preferably not more than 1%, more preferably not more than 0.1%. Further, the porosity is preferably not less than 0%. When this requirement is met, the gas sealing property of the interconnector 303 can be ensured, and the power generation efficiency of the solid oxide fuel cell stack can be improved. The porosity can be measured by the following method.

Method of Obtaining Porosity from SEM Image

An SEM image is obtained by cutting out a specimen so as to include an interconnector from the solid oxide fuel cell stack and observing the interconnector with a scanning electron microscope (for example, S-4100 manufactured by Hitachi, Ltd.) under conditions of an accelerated voltage of 15 kV, a secondary electron image, and a magnification of 100 to 10000 times. The SEM image is evaluated by a software for image processing (for example, Winroofver 6.5.1 manufactured by MITANI CORPORATION). As a result, a histogram including a brightness as abscissa and an appearance frequency as ordinate is obtained. In this histogram, an area where the brightness is lower than the average of the minimum and the maximum of the brightness is regarded as a low-brightness area while an area where the brightness is higher than the average is regarded as a high-brightness area. The low-brightness area is determined as pores and the high-brightness area other than the pores is determined as the interconnector for binarization processing. Thereafter, the porosity is obtained by the following equation.

Porosity (%)=Value of integral in low-brightness area÷Value of integral of appearance frequency of whole×100

In the present invention, in order to confirm that the interconnector 303 has a desired porosity obtained by the above method, the porosity determined by the following method can be used as one index.

Method of Obtaining Porosity by Archimedes Method

Specimens are obtained by subjecting a raw material powder for the interconnector to uniaxial pressing under a load of 900 kgf/cm$^2$ and firing the pressed product at 1300° C. for 2 hours under an atmospheric environment. For the specimens, the porosity is measured by an Archimedes method according to JIS R 1634.

Electric Conductivity

In the present invention, the electrical conductivity of the interconnector 303 is preferably not less than 0.05 S/cm, more preferably not less than 0.1 S/cm under an atmospheric environment at 700° C. Further, the higher the electrical conductivity, the better the results. Therefore, there is no upper limit on the electrical conductivity. Preferably, however, the electrical conductivity is not more than 0.16 S/cm. When this requirement is met, the interconnector 303 can be improved and the power generation output of the solid oxide fuel cell stack 210 can be improved.

The electrical conductivity can be measured by the following method. Specifically, specimens for the measurement of electrical conductivity can be prepared by subjecting a raw material powder for the interconnector to uniaxial pressing under a load of 900 kgf/cm$^2$ and firing the pressed product at 1300° C. for 2 hours under an atmospheric environment. The electrical conductivity of the specimens is measured by a direct current four-terminal method based on JIS (Japanese Industrial Standards) R 1650-2 under an atmospheric environment at 700° C.

In the present invention, preferably, both the solid electrolyte (104, 204, 304, 404) and the interconnector 303 contain strontium. In the present invention, more preferably, the amount of strontium contained in the interconnector 303 is larger than that of strontium contained in the solid electrolyte (104, 204, 304, 404). That is, still more preferably, the amount of strontium contained in the solid electrolyte (104, 204, 304, 404) is smaller than the amount of strontium contained in the interconnector 303.

In the interconnector 303, in the perovskite oxide represented by the above general formula, the content of strontium in the composition is preferably 30% by mole or more to 50% by mole or less in terms of element excluding oxygen. In the solid electrolyte (104, 204, 304, 404), the content of strontium in the composition is preferably not more than 15% by mole, more preferably 2.5% by mole or more to 15% by mole or less in terms of element excluding oxygen. That is, as described above, preferably, the solid electrolyte (104, 204, 304, 404) includes lanthanum gallate-based oxides (LSGMs) represented by general formula $La_{1-a}Sr_aGa_{1-b-c}Mg_bCo_cO_{3-\delta}$ wherein $0.05 \leq a \leq 0.3$, $0 < b < 0.3$, and $0 \leq c \leq 0.15$; and $\delta$ is a value that is determined so as to meet charge neutralization conditions.

Thickness

In the present invention, the thickness of the interconnector 303 is preferably 5 μm to 50 μm. The thickness of the interconnector 303 will be described later in more detail.

Insulating Member

In the present invention, the insulating member 310 has an insulating property. The insulating property means that the insulating member has an electrical insulating property and an oxide on insulating property. Specifically, the insulating property means that the insulating member has an electrical conductivity of not more than 0.001 S/cm under an atmospheric environment at 700° C. and has an oxide on insulating property. The electrical conductivity can be measured by the above method. Preferably, the insulating member 310 includes one or more materials selected from $Sr_xLa_yTiO_{3-\delta}$ wherein x and y are a real number that satisfies $0.8 \leq x+y \leq 1.0$ and $0 \leq y \leq 0.01$, $TiO_2$, forsterite ($Mg_2SiO_4$), MgO, $Al_2O_3$, $SiO_2$, and $Y_2O_3$. More preferred materials include $Sr_xLa_yTiO_{3-\delta}$ wherein x and y are a real number that satisfies $0.8 \leq x+y \leq 1.0$ and $0 \leq y \leq 0.01$, or forsterite.

Structure of Solid Oxide Fuel Cell Stack

With reference to FIG. 1A and FIG. 1B, the structure of the solid oxide fuel cell stack is further described. As illustrated in FIG. 1A, a horizontal-striped solid oxide fuel cell stack 210 includes 13 power generation elements connected in series on a support 201. Power generation elements 10, 20, 30, and 40 are four power generation elements continuously adjacent to each other.

FIG. 1B illustrates four adjacent power generation elements 10, 20, 30, 40 in a solid oxide fuel cell stack 210. The solid oxide fuel cell stack 210 in FIG. 1B is of a type in which the inner electrode is a fuel electrode 102, 202, 302, 402. The solid oxide fuel cell stack 210 includes a support 301, first/second fuel electrode, that is, fuel electrode layers 102a, 202a, 302a, 402a, and fuel electrode catalyst layers 102b, 202b, 302b, 402b, first/second solid electrolytes, that is, reaction inhibitory layers 104a, 204a, 304a, 404a, and solid electrolyte layers 104b, 204b, 304b, 404b, air electrodes 105b, 205b, 305b, 405b, current collecting layers 105a, 205a, 305a, 405a, and an interconnector 303. Here, first/second means that the structure is a single-layer or two-layer structure and, in two layers, has a first layer and a second layer.

Figure 2:
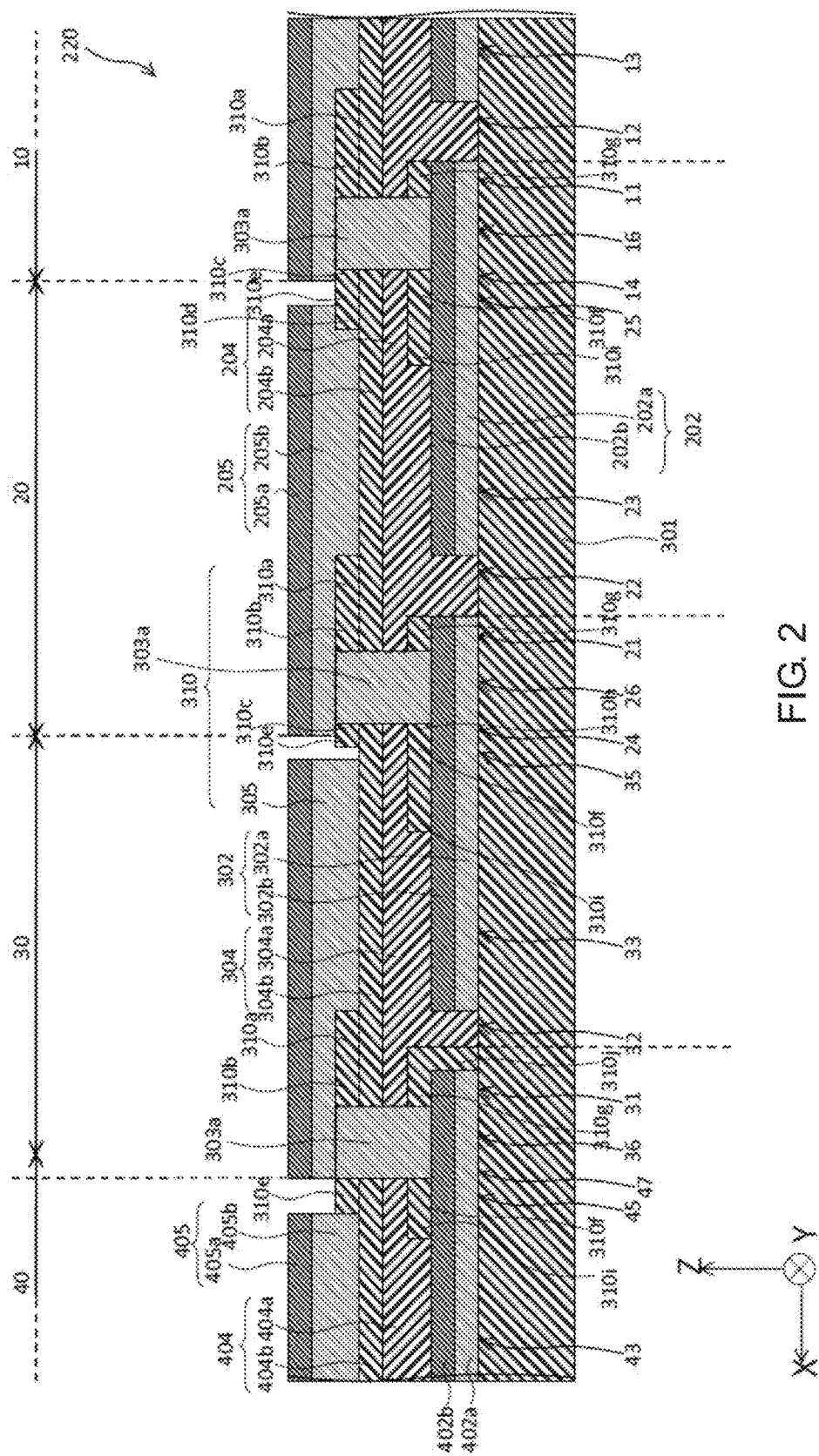
FIG. 2 is a cross-sectional schematic view of four adjacent power generation elements constituting a solid oxide fuel cell stack according to the present invention.

FIG. 2 is a schematic view of one preferred embodiment of the solid oxide fuel cell stack 220 according to the present invention. In the solid oxide fuel cell stack 220, four adjacent power generation elements (10, 20, 30, 40) are illustrated. The solid oxide fuel cell stack 220 includes a support 301 and four power generation elements (10, 20, 30, 40) provided on a surface of the support 301. When the two adjacent power generation elements in the four power generation elements are a first power generation element 20 and a second power generation element 30, the first power generation element 20 includes, as constituent members, a first fuel electrode 202, a first air electrode 205, and a first solid electrolyte 204 provided between the first fuel electrode 202 and the first air electrode 205. The first fuel electrode 202 is arranged between the support 301 and the first air electrode 205. The second power generation element 30 includes, as constituent members, a second fuel electrode 302, a second air electrode 305, and a second solid electrolyte 304 provided between the second fuel electrode 302 and the second air electrode 305. The second fuel electrode 302 is arranged between the support 301 and the second air electrode 305.

The solid oxide fuel cell stack 220 further includes an interconnector 303a that electrically connects the first air electrode 205 in the first power generation element 20 to the second fuel electrode 302 in the second power generation element 30. The first power generation element 20 and the second power generation element 30 are connected in series through the interconnector 303a.

In the solid oxide fuel cell stack 220, from the surface of the support 301, the first fuel electrode 202, the first solid electrolyte 204, and the first air electrode 205, or the second fuel electrode 302, the second solid electrolyte 304, and the second air electrode 305 are arranged in Z-axis direction.

Each Area in Power Generation Element

The first power generation element 20 includes, for example, a second area 22, a third area 23, and a sixth area 26. In this example, the first power generation element 20 further includes a first area 21, a fourth area 24 and a fifth area 25. In the solid oxide fuel cell stack 220, when a direction that is vertical to Z-axis direction and in which oxide ions migrate is presumed to be an X-axis direction, in the first power generation element 20, the third area 23, the second area 22, and the sixth area 26 are continuously provided in that order and adjacent to each other in X-axis direction. Further, when the first power generation element 20 further includes a first area 21, a fourth area 24 and a fifth area 25, the fifth area 25, the third area 23, the second area 22, the first area 21, the sixth area 26, and the fourth area 24 are provided in that order and adjacent to each other in X-axis direction.

For example, in the first area 21 in the first power generation element 20, the second fuel electrode 302, the first solid electrolyte 204, and the first air electrode 205 are arranged in that order in Z-axis direction. In the second area 22 in the first power generation element 20, the first solid electrolyte 204 and the first air electrode 205 are arranged in that order in Z-axis direction. In the third area 23 in the first power generation element 20, the first fuel electrode 202, the first solid electrolyte 204, and the first air electrode 205 are arranged in that order in Z-axis direction. In the fourth area 24 in the first power generation element 20, the second fuel electrode 302, the second solid electrolyte 304, and the first air electrode 205 are arranged in that order in Z-axis direction. In the fifth area 25 in the first power generation element 20, the first fuel electrode 202 and the first solid electrolyte 204 are arranged in that order in Z-axis direction. In the sixth area 26 in the first power generation element 20, the second fuel electrode 302, the interconnector 303a, and the first air electrode 205 are arranged in that order in Z-axis direction. The first area 21, the fourth area 24, and the sixth area 26 are formed of a constituent member for the first power generation element 20 and a constituent member for the second power generation element 30. The second area 22, the third area 23, and the fifth area 25 consists of only a constituent member for the first power generation element 20. The third area 23 includes all constituent members for the first power generation element 20. That is, in the third area 23, the first fuel electrode 202, the first solid electrolyte 204, and the first air electrode 205 are arranged in that order in Z-axis direction, and the third area 23 functions as a power generation unit in the first power generation element 20. In the sixth area 26, the first power generation element 20 (first air electrode 205) and the second power generation element 30 (second fuel electrode 302) are connected in series through the interconnector 303a. The thickness of the interconnector 303a refers to a length of the interconnector 303a along Z-axis in the sixth area 16, 26, 36. That is, the length between the fuel electrode, for example, second fuel electrode 302, and the air electrode, for example, first air electrode 205, corresponds to the thickness of the interconnector 303a.

As shown in FIG. 2, in this example, the second power generation element 30 also includes the first area 31 to the sixth area 36.

Insulating Portion and Each Portion Thereof

The solid oxide fuel cell stack 220 further includes an insulating member 310. In the solid oxide fuel cell stack 220, the insulating member 310 is in contact with the interconnector 303a. The insulating member 310 includes a first portion 310a. In this example, the insulating member 310 further includes a second portion 310b, a third portion 310c, a fourth portion 310d, and a fifth portion 310e. The insulating member 310 may further include a sixth portion 310f, a seventh portion 310g, an eighth portion 310h, a ninth portion 310i, and a tenth portion 310j.

In the second area 22, the first portion 310a is provided between the first solid electrolyte 204 and the first air electrode 205. The first portion 310a is provided in contact with the interconnector 303a. In the first area 21, the second portion 310b is provided between the first solid electrolyte 204 and the first air electrode 205. As illustrated in FIG. 2, when the insulating member 310 includes the second portion 310b, the second portion 310b is provided in contact with the interconnector 303a. When the insulating member 310 includes the first portion 310a, leakage of oxide ions caused by contact between the first air electrode 205 and the first solid electrolyte 204 can be prevented. Therefore, the formation of a counter cell can be suppressed.

In the solid oxide fuel cell stack 220, the whole area of the surface of the interconnector 303a is preferably covered with the first air electrode 205. This can enlarge the area of contact between the interconnector 303a and the first air electrode 205. As a result, the electrically conductive area of the interconnector 303a can be increased, contributing to enhanced electrical conductivity. Thus, the output of power generation of the power generation element can be improved.

The insulating member 310 is described in more detail. The third portion 310c in the insulating member 310 is provided between the second solid electrolyte 304 and the first air electrode 205 in the fourth area 24. The whole area of the surface of the first portion 310a, the second portion 310b, and the third portion 310c in the insulating member 310 is covered with the first air electrode 205. The third portion 310c is provided in contact with the interconnector 303a. Leakage of oxide ions can be prevented by adopting such a construction that the air electrode 205 in one power generation element 20 is not in contact with the solid electrolyte 304 in the other power generation element 30. As a result, the formation of a counter cell can be suppressed. Further, the distance between the adjacent power generation elements can be reduced, and the resistance between the power generation elements can be reduced.

In a part or the whole in X-axis direction of the fifth area 35 in the second power generation element 30, the fifth portion 310e in the insulating member 310 is provided on the second solid electrolyte 304 and is provided adjacent to the third portion 310c in X-axis direction. By virtue of this construction, the contact between the first air electrode 205 and the second solid electrolyte 304 can be more reliably prevented, and leakage of oxide ions can be more reliably prevented, contributing to the suppression of the formation of a counter cell. Further, the gas sealing property of the interconnector 303a can be further enhanced.

As illustrated in FIG. 2, in a part in X-axis direction of the third area 23 in the first power generation element 20, the fourth portion 310d in the insulating member 310 is provided between the first solid electrolyte 204 and the first air electrode 205. The fourth portion 310d is provided adjacent to the fifth portion 310e in X-axis direction. This allows the gas sealing property of the interconnector 303a to be improved. On the other hand, the third area (13, 23, 33, 43) in the power generation element (10, 20, 30, 40) is an area that contributes to power generation. Therefore, an embodiment where the fourth portion 310d is not provided can be adopted from the viewpoint of power generation efficiency.

Figure 3:
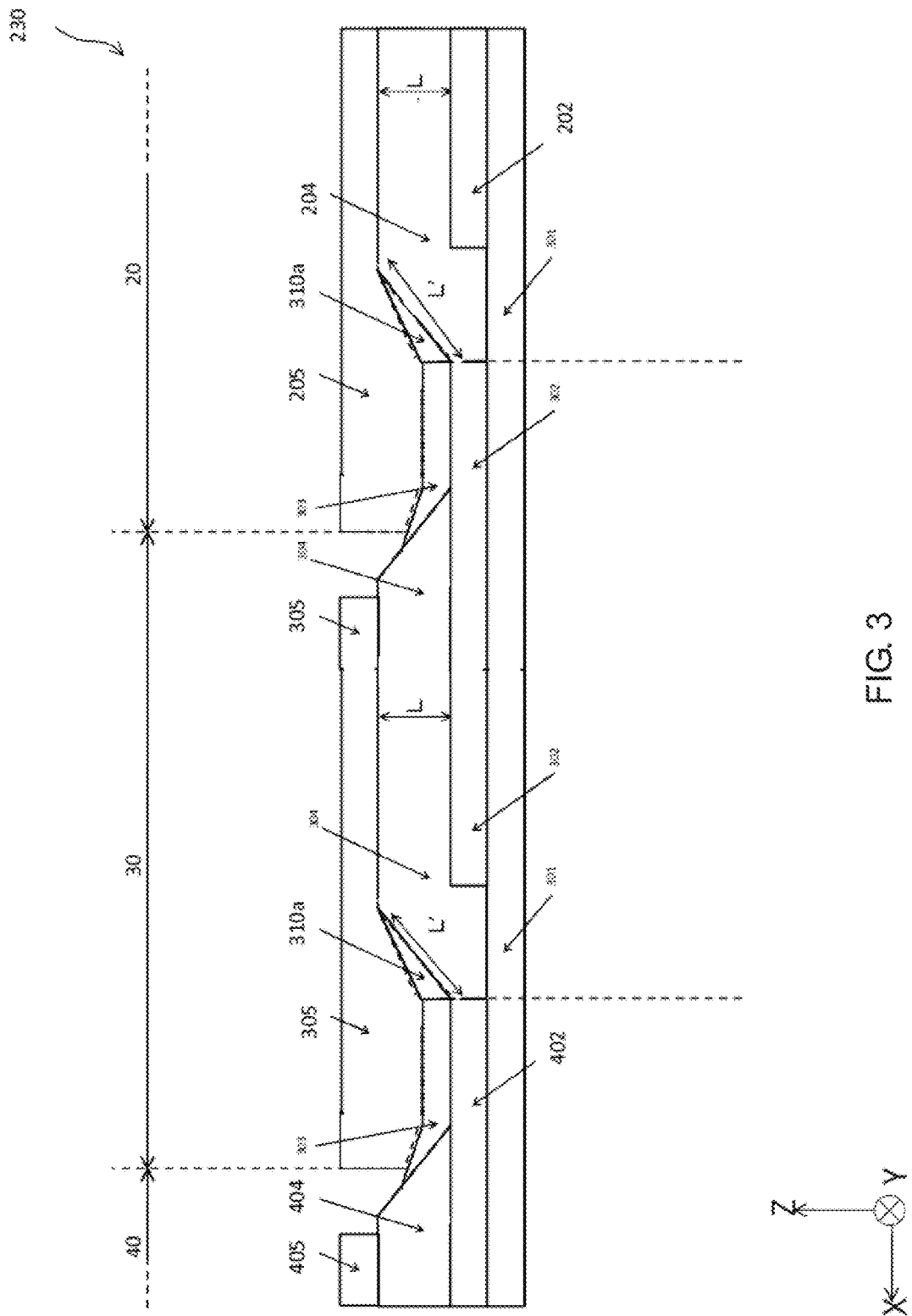
FIG. 3 is a cross-sectional schematic view of three adjacent power generation elements constituting a solid oxide fuel cell stack according to the present invention.

FIG. 3 is one of preferred embodiments of the solid oxide fuel cell stack according to the present invention. A solid electrolyte 204 in one power generation element 20 in two adjacent power generation elements is provided between a fuel electrode 202 in the adjacent one power generation element 20 and a fuel electrode 302 in the adjacent other power generation element 30. Further, an insulating member 310a, 310b is provided at a position that is on the solid electrolyte 204 in the adjacent one power generation element 20 and between a air electrode 205 in the adjacent one power generation element 20 and the solid electrolyte 204. This construction can prevent leakage of oxide ions produced through the contact of the air electrode 205 in the adjacent one power generation element 20 and the solid electrolyte 204 in the adjacent one power generation element 20, contributing to the suppression of the formation of a counter cell.

In a preferred embodiment of the present invention, as illustrated in FIG. 3, in the solid oxide fuel cell stack 240, an insulating member (310a, 310b) is provided between the solid electrolyte 204 in one power generation element 20 in two adjacent power generation elements and the air electrode 205 in the one power generation element 20, further, an insulating member 310c is provided between the air electrode 205 in the adjacent one power generation element 20 and the solid electrolyte 304 in the adjacent other power generation element 30, and both the insulating member (310a, 310b) and the insulating member 310c are in contact with the interconnector 303a. This construction can realize a solid oxide fuel cell stack having better power generation performance.

Further, in the solid oxide fuel cell stack 230, the whole area of the surface of the interconnector 303a is covered with the air electrode in adjacent one power generation element. This can enlarge an area of contact between the interconnector 303a and the air electrode 205. As a result, an electrically conductive area of the interconnector 303a can be enlarged, and thus the electrical conductivity can be enhanced. Thus, the output of power generation of the power generation element can be improved. In the present invention, since the whole area of the surface of the interconnector 303a is covered with the air electrode 205, preferably, the air electrode 205 in the adjacent one power generation element 20 is not in contact with the solid electrolyte 304 in the adjacent other power generation element 30.

Figure 4:
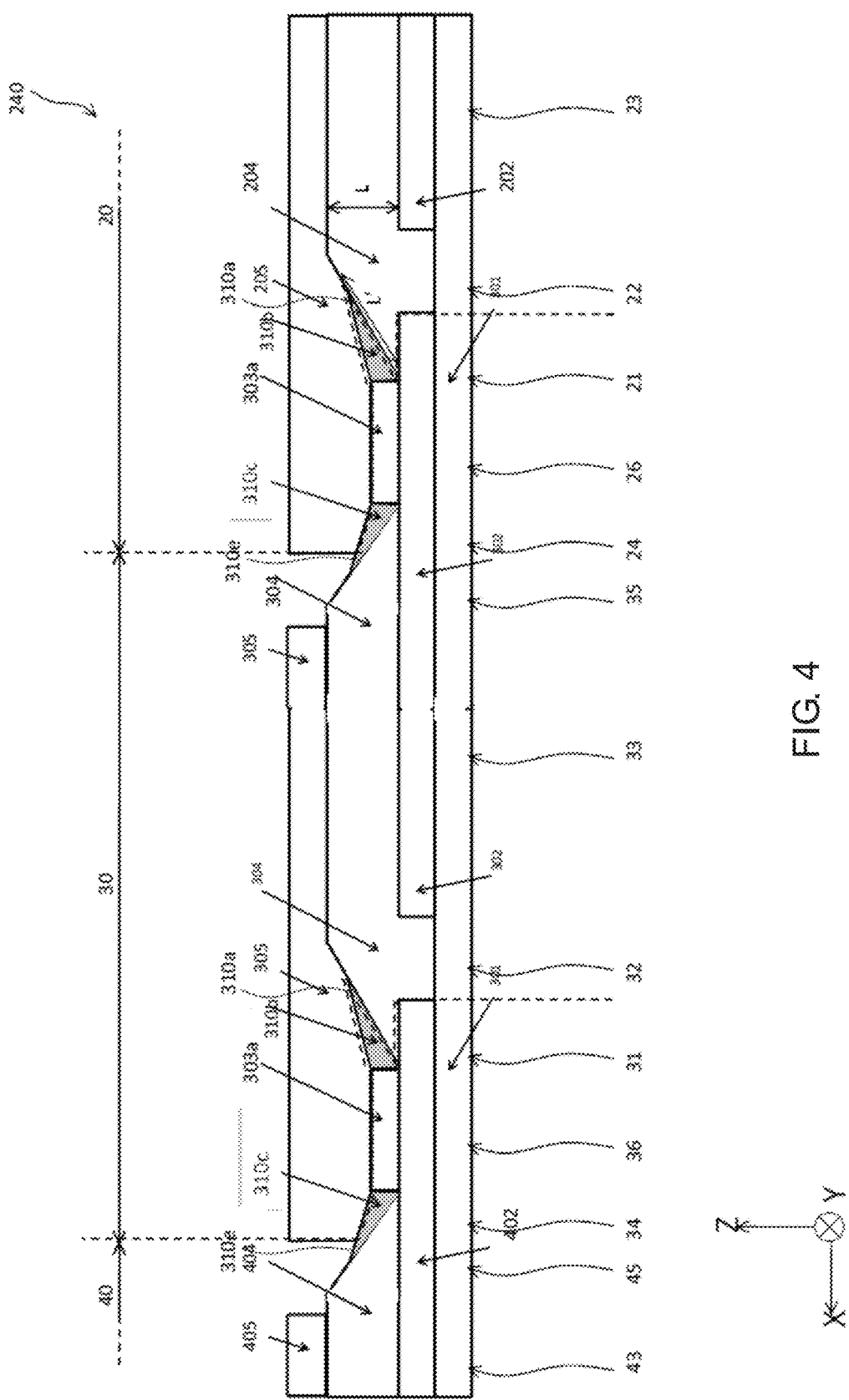
FIG. 4 is a cross-sectional schematic view of three adjacent power generation elements constituting a solid oxide fuel cell stack according to the present invention.

As illustrated in FIG. 4, in a preferred embodiment of the present invention, the solid oxide fuel cell stack 240 satisfies a relationship of $L'/L \geq 2$ wherein L represents the thickness of the solid electrolyte in one of the adjacent power generation elements; and L' represents a distance of junction between the insulating member and the solid electrolyte. Specifically, as illustrated in FIG. 2, in the solid oxide fuel cell stack 220, the thickness L is a length in Z-axis direction from an upper surface of the first fuel electrode 202 to a lower surface of the first air electrode 205 in the first solid electrolyte 204 arranged in the third area 23. The junction distance L' is the total of a length of a portion where the first portion 310a in the insulating member 310 is in contact with the first solid electrolyte 204, and a length of a portion where the second portion 310b in the insulating member 310 is in contact with the first solid electrolyte 204.

In order not to adversely affect the power generation performance of one of adjacent power generation elements, for example, first power generation element 20, preferably, the insulating member 310 is not provided on the fuel electrode (202) in the adjacent one power generation element (20). Satisfying a relationship of $L'/L \leq 50$ is further preferred. When this requirement is met, high power generation performance can be obtained. The distance of junction between the insulating member 310 and the solid electrolyte (104, 204, 304) means a length of a portion where the insulating member 310 is joined to an identical solid electrolyte in the solid electrolytes (104, 204, 304). That is, in the solid oxide fuel cell stack 230, the distance of junction is the length of a portion where the first portion 310a and the second portion 310b are joined to the solid electrolyte 204. As illustrated in FIG. 2, when the insulating member 310 includes a seventh portion 310g or a tenth portion 310j, the junction distance L' is the total of a length of a part where the seventh portion 310g and the tenth portion 310j are joined to the solid electrolyte 304, and a length of a part where the first portion 310a and the second portion 310b are joined to the identical solid electrolyte 304.

In an example illustrated in FIG. 4, the insulating member 310 further includes a third portion 310c and a fifth portion 310e. These portions are joined to the second solid electrolyte 304 rather than the first solid electrolyte 204. That is, in FIG. 4, the solid oxide fuel cell stack 240 has two junction distances as junction distances between the insulating member and the solid electrolyte, that is, a junction distance L' between a specific portion of the insulating member and the first solid electrolyte 204 and a junction distance L" between the other portion of the insulating member and the second solid electrolyte 304. More preferably, the junction distance L" between the insulating member 310 and the solid electrolyte 304 meets a relationship of $L''/L \geq 2$. The junction distance L" is the total of a length of a portion where the third portion 310c is joined to the solid electrolyte 304, and a length of a portion where the fifth portion 310e is joined to the identical solid electrolyte 304. As illustrated in FIG. 2, when the insulating member 310 further includes, in addition to the third portion 310c and the fifth portion 310e, a sixth portion 310f and a ninth portion 310i that will be described later, the junction distance L" is the total of a length of a portion where the sixth portion 310f and the ninth portion 310i are joined to the solid electrolyte 304, and a length of a portion where the third portion 310c and the fifth portion 310e are joined to the identical solid electrolyte 304.

Here, the junction or joining as used herein refers to an arrangement of two constituent members where they are in directly and closely contact with each other without any gap. The junction distance and the thickness can be determined by the following method. At the outset, a prepared solid oxide fuel cell stack is cut to obtain a cut plane including one of adjacent power generation elements and the other of adjacent power generation elements. The junction distance may be determined by observing the cut plane three times with a scanning electron microscope (SEM) at any magnification of 1 to 100 times, adding the maximum value to the minimum value of the junction distance, and dividing the total by 2. The thickness may be determined in the same manner as described just above.

Figure 5:
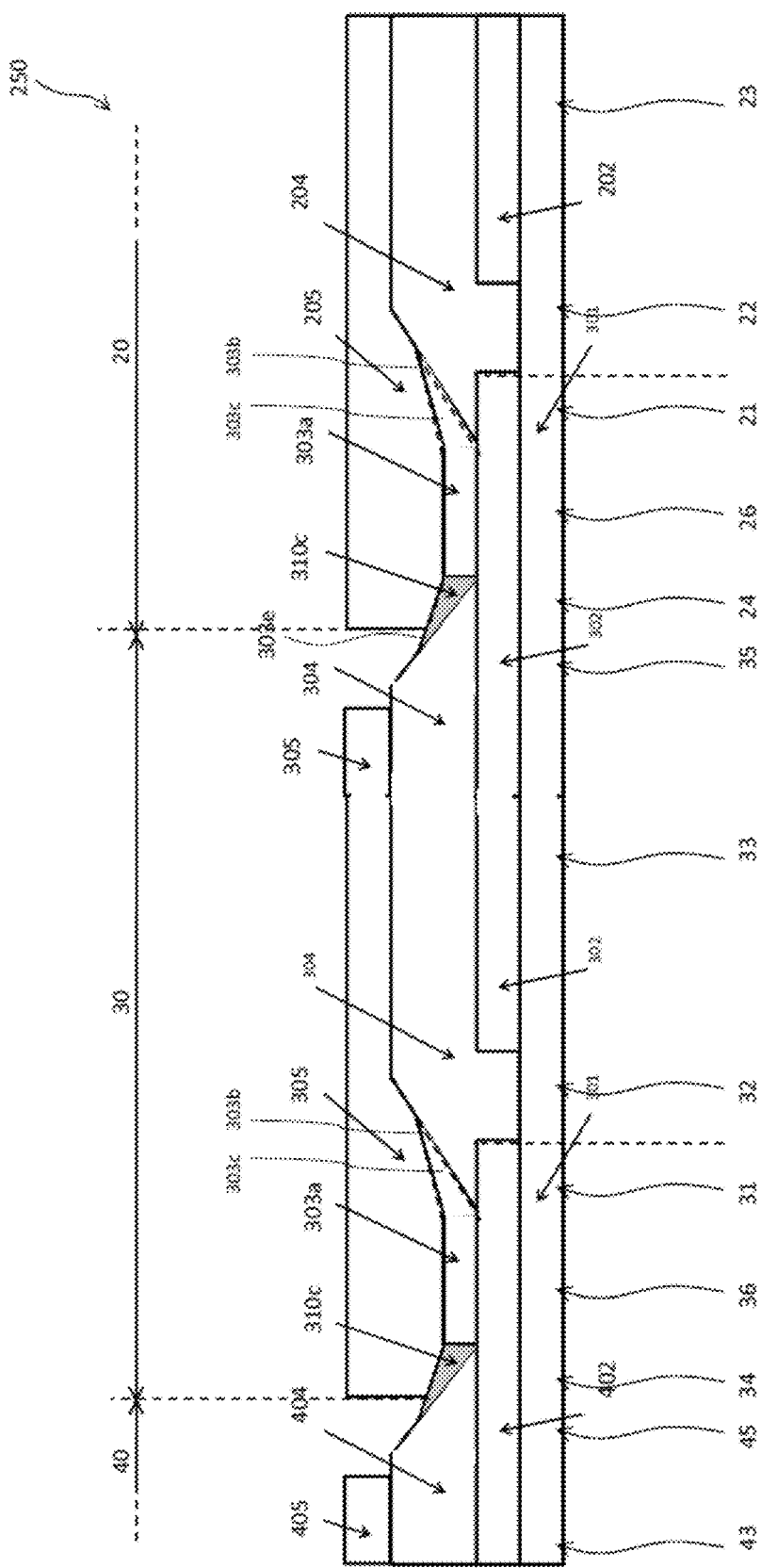
FIG. 5 is a cross-sectional schematic view of three adjacent power generation elements constituting a solid oxide fuel cell stack according to the present invention.

As shown in FIG. 5, in the solid oxide fuel cell stack 250, the interconnector 303 further includes a second portion 303b and a third portion 303c. In the solid oxide fuel cell stack 250, oxide ion-insulative materials for the interconnector 303a are used instead of the insulating member 310a, 310b. In the second area 22, the second portion 303b is provided between the first solid electrolyte 204 and the first air electrode 205. In the first area 21, the third portion 303c is provided between the first solid electrolyte 204 and the first air electrode 205. The interconnector 303 is insulative against oxide ions and thus can enhance gas sealing property. In this example, the insulating member 310 includes a third portion 310c and a fifth portion 310e. Accordingly, leakage of oxide ions produced by contact between the first air electrode 205 and the second solid electrolyte 304 can be prevented, contributing to the suppression of the formation of a counter cell. In addition, gas sealing property of the interconnector 303 can be further enhanced.

Figure 6:
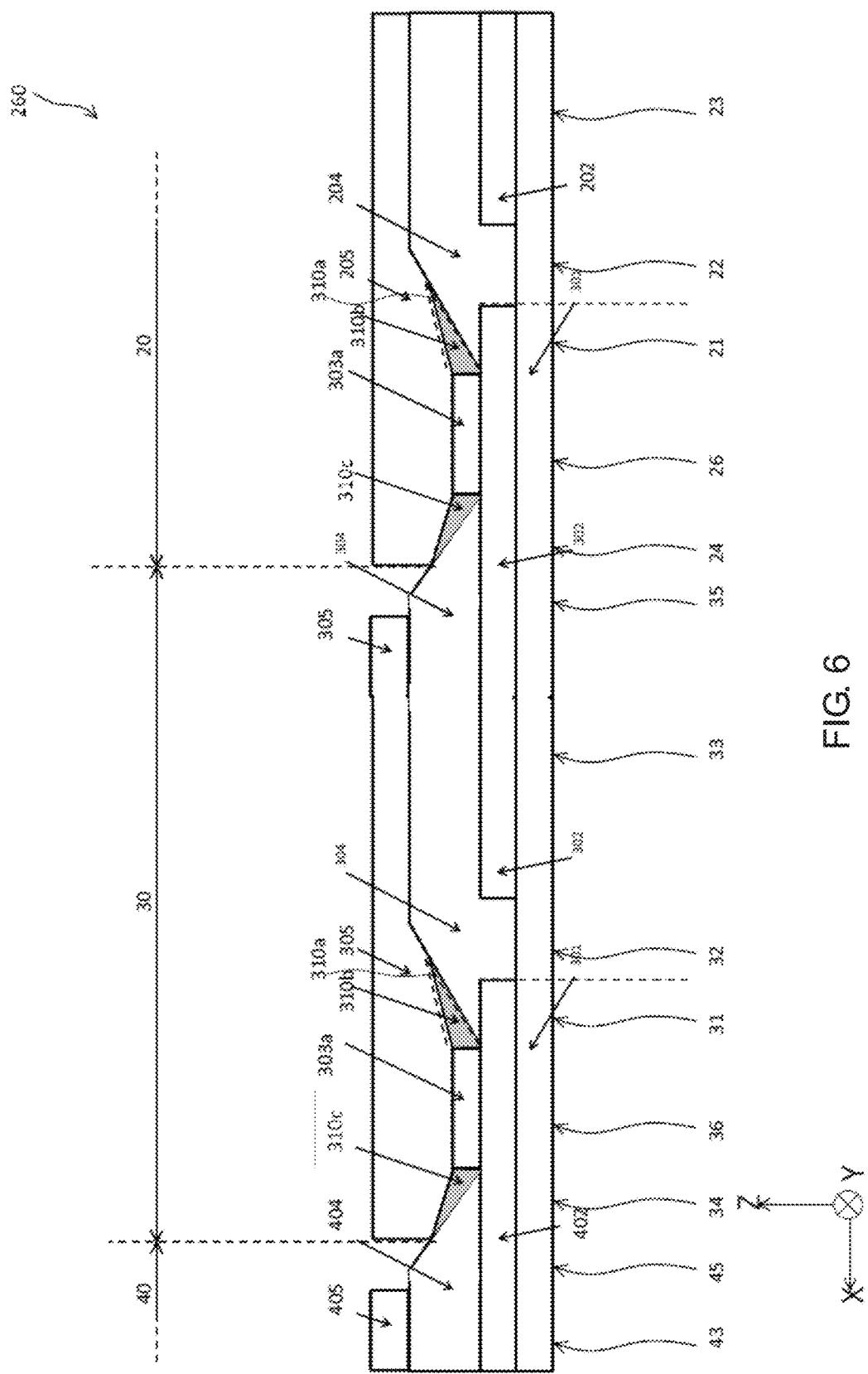
FIG. 6 is a cross-sectional schematic view of three adjacent power generation elements constituting a solid oxide fuel cell stack according to the present invention.

In a preferred embodiment of the present invention, as illustrated in FIG. 6, in the solid oxide fuel cell stack 260, the whole area of the surface of two insulating members, that is, the insulating member (310a, 310b) and the insulating member 310c, is covered with the air electrode 205 in the adjacent one power generation element. By virtue of this construction, the distance between adjacent air electrodes (205 and 305) and, in its turn, the distance between the power generation elements (20 and 30), can be reduced, contributing to lowered resistance between the power generation elements (20 and 30). As a result, a solid oxide fuel cell stack 240 having excellent power generation performance can be obtained.

Figure 7:
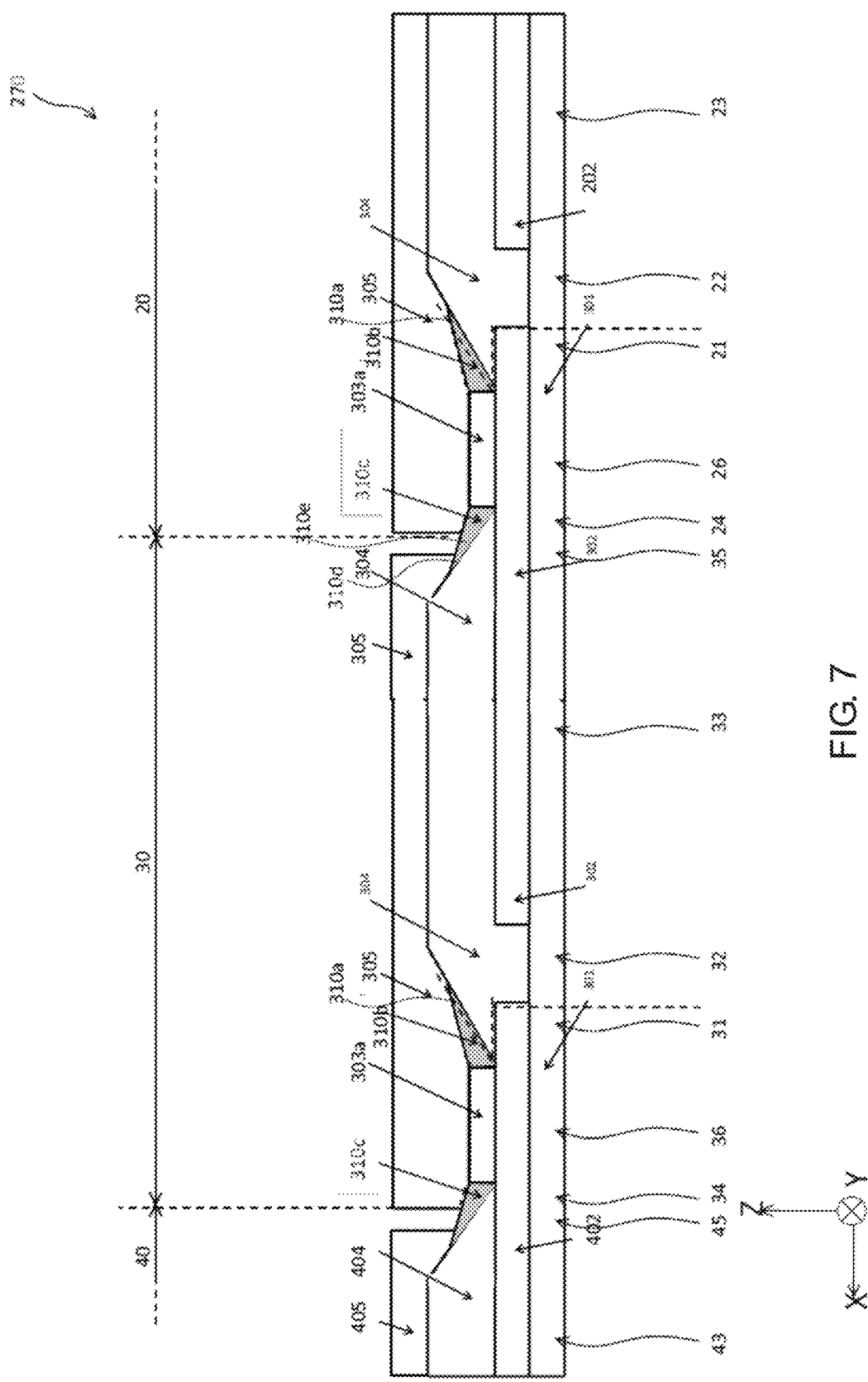
FIG. 7 is a cross-sectional schematic view of three adjacent power generation elements constituting a solid oxide fuel cell stack according to the present invention.
Figure 8:
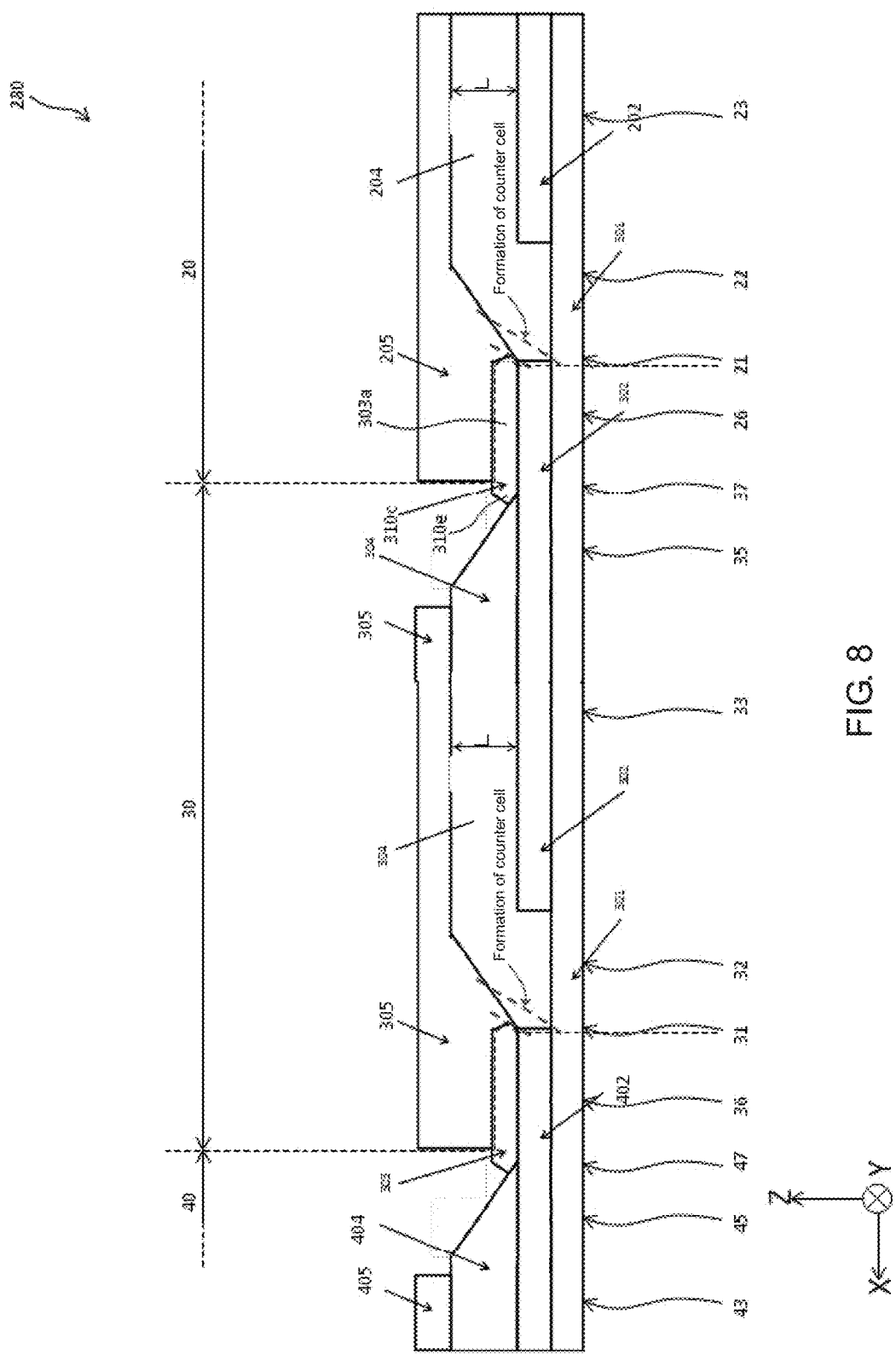
FIG. 8 is a cross-sectional view of an embodiment of a conventional solid oxide fuel cell stack.

In a preferred embodiment of the present invention, as illustrated in FIG. 7, in the solid oxide fuel cell stack 270, the insulating member 310e is in contact with the air electrode 305 in the adjacent other power generation element 30. An insulating member (310c, 310d, and 310e) provided between the air electrode 205 in the adjacent one power generation element 20 and the solid electrolyte 304 in the adjacent other power generation element 30 is in contact with the air electrode 305 in the adjacent other power generation element 30. A solid oxide fuel cell stack having better power generation performance can be obtained by a construction including the insulating member (310c, 310d, and 310e) joined to both the air electrode 205 in the adjacent one power generation element 20 and the air electrode 305 in the adjacent other power generation element 30.

With reference to FIG. 2 again, the insulating member 310 is further described. In a preferred embodiment of the present invention, the insulating member 310 in the solid oxide fuel cell stack 220 further includes an eighth portion 310h, in the fourth area 24 in the first power generation element 20, that is provided between the second fuel electrode 302 and the second solid electrolyte 304. By virtue of this, an unfavorable phenomenon that a counter cell is formed through the occurrence of power generation in the fourth area 24 where the second fuel electrode 302, the second solid electrolyte 304, and the first air electrode 205 are arranged in that order in Z-axis direction in the first power generation element can be suppressed. Further, the eighth portion 310h in the insulating member is joined to the interconnector 303a and the solid electrolyte 304, and, thus, the gas sealing property of the interconnector 303a can be enhanced.

In a preferred embodiment of the present invention, the insulating member 310 in the solid oxide fuel cell stack 220 further includes a sixth portion 310f, in the fifth area 35 in the second power generation element 30, that is provided between the second fuel electrode 302 and the second solid electrolyte 304. In this example, an interconnector 303a, an eighth portion 310h, and a sixth portion 310f are arranged in that order and are adjacent to each other in X-axis direction. The provision of the sixth portion 310f in the insulating member can further enhance the gas sealing property of the interconnector 303a.

In a preferred embodiment of the present invention, the insulating member 310 in the solid oxide fuel cell stack 220 further includes a ninth portion 310i, in a part of the third area 33 in the second power generation element 30, that is provided between the second fuel electrode 302 and the second solid electrolyte 304. In this example, a sixth portion 310f and a ninth portion 310i are arranged in that order and are adjacent to each other in X-axis direction. The provision of the ninth portion 310i in the insulating member can further enhance the gas sealing property of the interconnector 303a. On the other hand, the third area (13, 23, 33, 43) in the power generation element (10, 20, 30, 40) is an area that contributes to power generation. Therefore, an embodiment where the ninth portion 310i is not provided can be adopted from the viewpoint of power generation efficiency.

In a preferred embodiment of the present invention, the insulating member 310 in the solid oxide fuel cell stack 220 further includes a seventh portion 310g, in the first area 21 in the first power generation element 20, that is provided between the second fuel electrode 302 and the first solid electrolyte 204. For example, the seventh portion 310g is disposed in contact with the interconnector 303a. By virtue of this, an unfavorable phenomenon that a counter cell is formed due to the occurrence of power generation in the first area 21 where the second fuel electrode 302, the first solid electrolyte 204, and the first air electrode 205 are arranged in that order in Z-axis direction in the first power generation element 20 can be suppressed. Further, since the seventh portion 310g is joined to the interconnector 303a, the gas sealing property of the interconnector 303a can be improved.

In a preferred embodiment of the present invention, the insulating member 310 in the solid oxide fuel cell stack 220 further includes a tenth portion 310j, in the second area 32 in the second power generation element, that is provided between the support 301 and the second solid electrolyte 304 in Z-axis direction and between the second solid electrolyte 304, and the third fuel electrode 402 and the seventh portion 310g in the insulating member in X-axis direction. This can enhance the gas sealing property of the interconnector 303a.

In another embodiment of the present invention, materials for the interconnector 303a that are insulative against oxide ions may be used instead of each of the above insulating portions.

Method for Manufacturing Solid Oxide Fuel Cell Stack

The solid oxide fuel cell stack according to the present invention may be manufactured by any method without particular limitation to particular method. For example, the solid oxide fuel cell stack according to the present invention can be manufactured as follows. The manufacturing method will be described by taking, as an example, a fuel electrode as an inner electrode and an air electrode as an outer electrode.

For example, the support can be prepared as follows. At the outset, a solvent (for example, water or alcohol) is added to a raw material powder to prepare a green body. In this case, dispersants, binders, defoamers, or pore forming agents or a combination thereof may be added as optional ingredients. For example, sheet molding, press molding, and extrusion molding are used for molding of the green body. When a support with a gas passage formed in the interior thereof is molded, extrusion molding is preferably used. When a support having a multi-layered structure is molded, in addition to multi-layer extrusion molding in which a plurality of layers are extruded at a time, a method in which the upper layer is formed by coating or printing may also be used. Specific examples of coating methods include slurry coating methods in which a raw material slurry is coated, tape casting methods, doctor blade methods, and transfer methods. Specific examples of printing methods include screen printing methods and ink jet printing methods. Next, the prepared green body is molded, and the molded product is dried to obtain a support precursor. Thereafter, a preferred method may be adopted in which the support precursor is then calcined (800° C. (inclusive) to 1100° C. (exclusive)) to obtain a porous calcination product for the support and the calcination product for the support is solely fired to obtain a support. Alternatively, the calcination product for the support, together with at least a fuel electrode and others, may be fired to obtain a support. The firing is preferably carried out at 1100° C. (inclusive) to 1400° C. (exclusive).

For example, the interconnector and the insulating member can be prepared as follows. At the outset, each raw material powder is prepared. The raw material powder can be prepared, for example, by a solid phase method. That is, powders of metal oxides as the raw material are weighed so as to provide a desired composition ratio. The powders are mixed in a solution, and the solvent is removed to obtain a powder. The powder is fired, for example, at 1150° C., followed by grinding to prepare a raw material powder. A solvent (for example, water or alcohol) and, if necessary, molding assistants such as dispersants and binders are added to the raw material powder to prepare a slurry or a paste. An interconnector and an insulating member can be obtained by coating the slurry or the paste, drying the slurry or the paste (80° C. or more to 1100° C. or less, preferably 300° C. or more to 1100° C. or less) to form a dried film and firing the film (1100° C. (inclusive) to 1400° C. (exclusive), preferably 1250° C. (inclusive) to 1400° C. (exclusive)). The coating may be carried out by the same method as described above. Alternatively, a method may be adopted in which each dried film is previously formed as a transfer sheet and the transfer film is applied to a lamination body.

For example, the fuel electrode, the solid electrolyte, and the air electrode can be prepared as follows. A solvent (for example, water or alcohol) and, if necessary, molding assistants such as dispersants and binders are added to the raw material powder to prepare a slurry or a paste. The fuel electrode, the solid electrolyte, and the air electrode can be obtained by coating the slurry or the paste, drying the slurry or the paste (80° C. or more to 1100° C. or less, preferably 300° C. or more to 1100° C. or less) to form a dried film and firing the film (1100° C. (inclusive) to 1400° C. (exclusive), preferably 1250° C. (inclusive) to 1400° C. (exclusive)). The coating may be carried out by the above-described method. Alternatively, a method may be adopted in which each dried film is previously formed as a transfer sheet and the transfer film is applied to a lamination body.

In a preferred embodiment of the manufacturing method according to the present invention, firing is carried out for each layer formation. That is, in this embodiment, the manufacturing method includes at least the steps of: forming a dried film for a fuel electrode on a surface of a support or a calcination product for the support and then firing the dried film to form a fuel electrode; forming a dried film for a solid electrolyte and then firing the dried film to form a solid electrolyte; forming a dried film for an interconnector and a dried film for an insulating member and then firing the dried films to form an interconnector and an insulating member; and forming a dried film for an air electrode and firing the dried film to form an air electrode. A current collecting layer is formed after the formation of the air electrode.

In another preferred embodiment of the manufacturing method according to the present invention, the manufacturing method includes the steps of: preparing a support or a calcination product for the support, forming, on a surface of the support or the calcination product for the support, a dried film for a fuel electrode, and a dried film for a solid electrolyte, co-firing (1250° C. (inclusive) to 1400° C. (exclusive)) a stacked molded product including the support and the dried films of the fuel electrode and the solid electrolyte, then forming a dried film for an interconnector and a dried film for an insulating member, co-firing (1250° C. (inclusive) to 1400° C. (exclusive)) them, further forming a dried film for an air electrode, and firing the whole.

In the above embodiment of the manufacturing method according to the present invention, co-firing is carried out in which the interconnector and the insulating member are fired at a time. In this embodiment, preferably, the firing is carried out under an oxidizing atmosphere so as to prevent a deterioration in the solid electrolyte and the interconnector, for example, by diffusion of dopant. More preferably, the firing is carried out using a mixed gas composed of air and oxygen under an atmosphere having an oxygen concentration of 20% by mass or more to 30% by mass or less.

In the above embodiment of the manufacturing method according to the present invention, it is considered that, when the interconnector and the insulating member are co-fired, mutual element diffusion occurs between the interconnector and the insulating member. The mechanism of the mutual element diffusion is considered as follows. However, the present invention is not limited thereto. When the interconnector and the insulating member are fired in such a state that they are in contact with each other, thermal diffusion of elements contained in the interconnector and the insulating member occurs from a high concentration region towards a lower concentration region by using a concentration gradient as a driving force. This allows the interconnector and the insulating member to be strongly adhered in these junctions, and, especially in a portion near the junctions, an integral fired body having a compositional gradient within a compositional range of raw materials for both the interconnector and the insulating member is formed. That is, a solid oxide fuel cell stack can be obtained that is excellent in gas sealing property and electrical conductivity of the interconnector and in insulating property of the insulating member.

In a preferred embodiment of the manufacturing method according to the present invention, the interconnector, the insulating member, and the solid electrolyte are obtained by co-firing (1250° C. (inclusive) to 1400° C. (exclusive)). In firing, elements contained in the interconnector, elements contained in the insulating member, and elements contained in the solid electrolyte are mutually diffused. That is, when elements contained in the interconnector, elements contained in the insulating member, and elements contained in the solid electrolyte are identical to one another, these elements are mutually diffused. Such elements include strontium and lanthanum. This can contribute to improved adhesion among the interconnector, the insulating member, and the solid electrolyte.

EXAMPLES

The present invention is further illustrated by the following Examples and Comparative Examples that are not intended as a limitation of the scope of the present invention.

Example A1

Preparation of Green Body A for Support

A Raw Material Powder of a High-Purity Forsterite ($Mg_2SiO_4$ containing 0.05% by mass of CaO) was regulated to a mean particle diameter of 0.7 µm. 100 parts by weight of this powder, 20 parts by weight of a solvent (water), 8 parts by weight of a binder (methylcellulose), 0.5 part by weight of a lubricant, and 15 parts by weight of a pore forming agent (acrylic resin particles having a mean particle diameter of 5 μm) were mixed in a rapid mixer, the mixture was kneaded in a kneader, the kneaded product was deaerated with a vacuum pug mill to prepare a green body for extrusion molding The mean particle diameter was measured according to JIS R1629 and expressed in terms of 50% diameter (the same shall apply hereinafter).

Preparation of Slurry for Fuel Electrode Layer

A NiO powder and a 10YSZ (10 mol % $Y_2O_3$-90 mol % $ZrO_2$) power were mixed together by wet mixing at a weight ratio of 65:35 to obtain a dry powder. The dry powder thus obtained was regulated to a mean particle diameter of 0.7 μm. 150 parts by weight of this powder and 100 parts by weight of a solvent (carbitol) were mixed with 6 parts by weight of a binder (a soluble polymer), 2 parts by weight of a dispersant (a nonionic surfactant), and 2 parts by weight of an defoamer (organic polymeric substance-based). The mixture was thoroughly stirred to prepare a slurry.

Preparation of Slurry for Fuel Electrode Catalyst Layer

A mixture of a NiO powder and a GDC10 (10 mol % $GdO_{1.5}$-90 mol % $CeO_2$) powder was prepared by a coprecipitation method and was heat-treated to obtain a powder for a fuel electrode catalyst layer. The mixing ratio between the NiO powder and the GDC10 powder was 50/50 in terms of weight ratio. The mean particle diameter of the powder for the fuel electrode catalyst layer was regulated to a mean particle diameter of 0.5 μm. 100 parts by weight of this powder was mixed with 100 parts by weight of a solvent (carbitol), 5 parts by weight of a binder (a soluble polymeric substance), 2 parts by weight of a dispersant (nonionic surfactant), and 2 parts by weight of an defoamer (an organic polymeric substance). The mixture was thoroughly stirred to prepare a slurry.

Preparation of Slurry for Reaction Inhibitory Layer 50 parts by weight of a powder of cerium-based composite oxide LDC40 (40 mol % $LaO_{1.5}$-60 mol % $CeO_2$) was used as a material for a reaction inhibitory layer. 0.04 part by weight of a $Ga_2O_3$ powder was mixed into the material powder as a sintering aid. Further, 100 parts by weight of a solvent (carbitol), 4 parts by weight of a binder (a soluble polymeric substance), 1 part by weight of a dispersant (a nonionic surfactant), and 1 part by weight of an defoamer (a organic polymeric substance) were mixed thereinto, and the mixture was thoroughly stirred to prepare a slurry.

Preparation of Slurry for Solid Electrolyte

An LSGM powder having a composition of $La_{0.9}Sr_{0.1}Ga_{0.8}Mg_{0.2}O_3$ was used as a material for a solid electrolyte. 50 parts by weight of this LSGM powder was mixed with 100 parts by weight of a solvent (carbitol), 4 parts by weight of a binder (a soluble polymeric substance), 1 part by weight of a dispersant (a nonionic surfactant), and 1 part by weight of an defoamer (an organic polymeric substance). The mixture was thoroughly stirred to prepare a slurry.

Preparation of Slurry for Air Electrode

A powder having a composition of $La_{0.6}Sr_{0.4}Co_{0.2}Fe_{0.8}O_3$ was used as a material for an air electrode. 40 parts by weight of this powder was mixed with 100 parts by weight of a solvent (carbitol), 2 parts by weight of a binder (a soluble polymeric substance), 1 part by weight of a dispersant (a nonionic surfactant), and 1 part by weight of an defoamer (an organic polymeric substance), and the mixture was thoroughly stirred to prepare a slurry.

Preparation of Raw Material Powder for Interconnector

A raw material powder for an interconnector was prepared by a solid phase method. Metal oxide powders as raw materials were weighed so that strontium, lanthanum, titanium, niobium, and iron were present at a composition ratio of a perovskite oxide represented by $Sr_{0.37}La_{0.55}Ti_{0.40}Nb_{0.10}Fe_{0.50}O_{3-\delta}$ and were mixed together in a solution. Thereafter, the solvent was removed to give a powder that was then fired at 1150° C. and ground to prepare a raw material powder for an interconnector.

Preparation of Slurry for Interconnector 40 parts by weight of the raw material powder for the interconnector thus prepared having a composition of $Sr_{0.37}La_{0.55}Ti_{0.40}Nb_{0.10}Fe_{0.50}O_{3-\delta}$, was mixed with 100 parts by weight of a solvent (carbitol), 4 parts by weight of a binder (a soluble polymeric substance), 1 part by weight of a dispersant (a nonionic surfactant), and 1 part by weight of an defoamer (an organic polymeric substance). The mixture was thoroughly stirred to prepare a slurry.

Preparation of Raw Material Powder for Insulating Member

A raw material powder for an insulating member was prepared by a solid phase method. Metal oxide powders as raw materials were weighed so that strontium, lanthanum, and titanium were present at a composition ratio of a perovskite oxide represented by $Sr_{0.92}La_{0.01}TiO_{3-\delta}$ and were mixed together in a solution. Thereafter, the solvent was removed to give a powder that was then fired at 1150° C. and ground to prepare a raw material powder for an insulating member.

Preparation of Slurry for Insulating Member 40 parts by weight of the raw material powder for the insulating member thus prepared having a composition of $Sr_{0.92}La_{0.01}TiO_{3-\delta}$, was mixed with 100 parts by weight of a solvent (carbitol), 4 parts by weight of a binder (a soluble polymeric substance), 1 part by weight of a dispersant (a nonionic surfactant), and 1 part by weight of an defoamer (an organic polymeric substance). The mixture was thoroughly stirred to prepare a slurry.

Preparation of Solid Oxide Fuel Cell Stack

A solid oxide fuel cell stack was prepared by the following method using the green body and each of the slurries prepared above.

A cylindrical molded body was prepared from a green body A for a porous support by an extrusion molding method. After drying at room temperature, the molded body was heat-treated at 1100° C. for 2 hours to prepare a calcined body for a support. A fuel electrode, a fuel electrode catalyst layer, a reaction inhibitory layer, and a solid electrolyte were formed in that order on a surface of the support by a slurry coating method, followed by drying to obtain a laminated molded body including dried layers stacked. The laminated molded body was co-fired at 1300° C. for 2 hours.

Next, an interconnector and an insulating member were formed by a slurry coating method, and then fired at 1250° C. for 2 hours. The interconnector and the insulating member were formed so that L'/L was 10.

Next, an air electrode was molded on the surface of the solid electrolyte so as to cover the whole area of the surface of the interconnector and to be in contact with the insulating member, followed by firing at 1100° C. for 2 hours to prepare a solid oxide fuel cell stack. The support had a dimension after co-firing of 10 mm in outer diameter and 1 mm in wall thickness. For the solid oxide fuel cell stack thus prepared, the thickness of the fuel electrode was 100 μm, the thickness of the fuel electrode catalyst layer was 10 μm, the thickness of the reaction inhibitory layer was 10 μm, the thickness of the solid electrolyte was 30 μm, thickness of the air electrode was 20 μm, the thickness of the interconnector was 15 μm, and the thickness of the insulating member was 15 μm. The outer diameter of the support was measured with a micrometer in a place where no layer was formed. The thickness of each of the members was determined by cutting the cell in the prepared cell stack, observing the cross section with a scanning electron microscope (SEM) at any magnification of 30 to 2000 folds three times, adding the maximum value to the minimum value thus obtained and dividing the total value by 2. The cut place was a central portion of the area where the air electrode layer was formed. For the solid oxide fuel cell stack, each of the following evaluations was carried out. The results are shown in Table 1.

Example A2

A solid oxide fuel cell stack was obtained in the same manner as in Example A1, except that L'/L was 50. The solid oxide fuel cell stack thus obtained was evaluated as follows. The results are shown in Table 1.

Example A3

A solid oxide fuel cell stack was obtained in the same manner as in Example A1, except that L'/L was 2. The solid oxide fuel cell stack thus obtained was evaluated as follows. The results are shown in Table 1.

Example A4

A solid oxide fuel cell stack was obtained in the same manner as in Example A1, except that L'/L was 1. The solid oxide fuel cell stack thus obtained was evaluated as follows. The results are shown in Table 1.

Example A5

A solid oxide fuel cell stack was obtained in the same manner as in Example A2, except that $Mg_2SiO_4$ was used as the raw material powder for the insulating member. The solid oxide fuel cell stack thus obtained was evaluated as follows. The results are shown in Table 1.

Example A6

A solid oxide fuel cell stack was obtained in the same manner as in Example A1, except that $Mg_2SiO_4$ was used as the raw material powder for the insulating member. The solid oxide fuel cell stack thus obtained was evaluated as follows. The results are shown in Table 1.

Example A7

A solid oxide fuel cell stack was obtained in the same manner as in Example A3, except that $Mg_2SiO_4$ was used as the raw material powder for the insulating member. The solid oxide fuel cell stack thus obtained was evaluated as follows. The results are shown in Table 1.

Comparative Example A1

A solid oxide fuel cell stack was obtained in the same manner as in Example A1, except that the insulating member was not provided and L'/L was 0. The solid oxide fuel cell stack thus obtained was evaluated as follows. The results are shown in Table 1.

Evaluation

L and L'

The length of L and L' was determined from the solid oxide fuel cell stack thus obtained. L is the thickness of the solid electrolyte. L was determined by cutting the cell in the prepared solid oxide fuel cell stack, observing the cross section with SEM at any magnification of 30 to 2000 times, adding the maximum thickness value to the minimum thickness value thus obtained and dividing the total value by 2. L' is the distance of junction at which the insulating member was in contact with the solid electrolyte. L' was determined by cutting the cell in the prepared solid oxide fuel cell stack, observing the cross section with SEM at any magnification of 30 to 2000 times, adding the maximum junction distance to the minimum junction distance thus obtained and dividing the total value by 2. The results are shown in Table 1.

Measurement of OCV

A power generation test was carried out using the solid oxide fuel cell stack thus obtained. A current collector on the fuel electrode side was formed by cladding a current collecting metal to an exposed area of the fuel electrode with a silver paste. A current collector on the air electrode side was formed by cladding a current collecting metal to an exposed area of an adjacent fuel electrode with a silver paste.

A power generation test was carried out under the following power generation conditions, and the electromotive force 0 hour after the operation (OCV (V)) was measured. The results are shown in Table 1.

Fuel gas: mixed gas composed of ($H_2$+3% $H_2O$) and $N_2$ (mixed ratio $H_2$:$N_2$=7:4 (vol:vol))

Oxidation gas: air

Operating temp.: 700° C.

Measurement of Critical Fuel Utilization

A power generation test was carried out while energizing at a current density of 0.4 A/cm² under the above conditions for the power generation test. Thereafter, the amount of the fuel gas supplied was gradually reduced, the amount of hydrogen supplied just before a rapid drop of the potential was measured, and the critical fuel utilization factor was calculated by the following equation. The results are shown in Table 1.

Critical fuel utilization factor=(Amount of hydrogen used in power generation)/(Amount of hydrogen supplied just before rapid drop of potential)×100

The amount of hydrogen used in the power generation was determined by the formula; amount of current (C/s)×60 (s)×22.4 (L/mol)÷Faraday constant (C/mol)×1/2 (valence)×number of power generation elements.

Measurement of Terminal Voltage

The voltage between terminals was measured under the following power generation conditions by connecting a potential wire and a current wire to the fuel electrode in the adjacent one power generation element and to the fuel electrode in the adjacent other power generation element. The results are shown in Table 1.

Fuel gas: mixed gas composed of ($H_2$+3% $H_2O$) and $N_2$ (mixed ratio $H_2$:$N_2$=7:4 (vol:vol))

Fuel utilization: 7%

Oxidation gas: air

Operation temp.: 700° C.

Current density: 0.4 A/cm²

TABLE 1

|  | L'/L | OCV | Critical fuel utilization factor |
|---|---|---|---|
| Example A1 | 10 | 1.15 V | 69% |
| Example A2 | 50 | 1.15 V | 69% |
| Example A3 | 2 | 1.14 V | 68% |
| Example A4 | 1 | 1.10 V | 52% |
| Example A5 | 50 | 1.14 V | 67% |
| Example A6 | 10 | 1.13 V | 66% |
| Example A7 | 2 | 1.13 V | 65% |
| Comparative Example A1 | 0 | 1.07 V | 50% |

Example B1

A green body A for a support, a slurry for a fuel electrode layer, a slurry for a fuel electrode catalyst layer, a slurry for a reaction inhibitory layer, a slurry for a solid electrolyte, a slurry for an air electrode, a raw material powder for an interconnector, a slurry for an interconnector, a raw material powder for each of an insulating member (310a and 310b) and an insulating member 310c, and a slurry for each of an insulating member (310a and 310b) and an insulating member 310c were prepared in the same manner as in Example A.

Preparation of Solid Oxide Fuel Cell Stack

A solid oxide fuel cell stack was prepared by the following method using the green body and each of the slurries obtained above.

A cylindrical molded body was prepared from a green body A for a porous support by an extrusion molding method. The molded body was dried at room temperature and was heat-treated at 1100° C. for 2 hours to prepare a calcined body for a support. A fuel electrode, a fuel electrode catalyst layer, a reaction inhibitory layer, and a solid electrolyte were formed in that order on a surface of the support by a slurry coating method and dried to obtain a laminated molded body including dried layers stacked. The laminated molded body was co-fired at 1300° C. for 2 hours.

Next, an interconnector, an insulating member 310c, and an insulating member (310a and 310b) were formed by a slurry coating method, and then fired at 1250° C. for 2 hours.

Next, an air electrode was molded on the surface of the solid electrolyte so as to cover the whole area of the surface of the interconnector and the insulating member (310a and 310b) and to be in contact with the insulating member 310c, followed by firing at 1100° C. for 2 hours to prepare a solid oxide fuel cell stack. The support had a dimension after co-firing of 10 mm in outer diameter and 1 mm in wall thickness. For the solid oxide fuel cell stack thus prepared, the thickness of the fuel electrode was 100 μm, the thickness of the fuel electrode catalyst layer was 10 μm, the thickness of the reaction inhibitory layer was 10 μm, the thickness of the solid electrolyte was 30 μm, the thickness of the air electrode was 20 μm, the thickness of the interconnector was 15 μm, and the thickness of the insulating member were 15 μm. The outer diameter of the support was measured with a micrometer in a place where no layer was formed. The thickness of each of the members was determined by cutting the solid oxide fuel cell stack thus prepared, observing the cross section with a scanning electron microscope (SEM) at any magnification of 30 to 2000 folds three times, adding the maximum thickness value to the minimum thickness value thus obtained and dividing the total value by 2. The cut place was a central portion of the area where the air electrode layer was formed. For the solid oxide fuel cell stack, each of the following evaluations was carried out. The results are shown in Table 2.

Example B2

A solid oxide fuel cell stack was obtained in the same manner as in Example B1, except that the insulating member (310a and 310b) was not formed. For the solid oxide fuel cell stack thus obtained, the following evaluations were carried out. The results are shown in Table 2.

Example B3

A solid oxide fuel cell stack was obtained in the same manner as in Example B1, except that $Mg_2SiO_4$ was used as the raw material powder for the insulating member 310c and the insulating member (310a and 310b). The solid oxide fuel cell stack thus obtained was evaluated as follows. The results are shown in Table 2.

Comparative Example B1

A solid oxide fuel cell stack was obtained in the same manner as in Example B1, except that the aft electrode was provided so as to cover a part of the interconnector. The solid oxide fuel cell stack thus obtained was evaluated as follows. The results are shown in Table 2.

Comparative Example B2

A solid oxide fuel cell stack was obtained in the same manner as in Example B1, except that the insulating member 310c and the insulating member (310a and 310b) were not provided and the air electrode was provided so as to cover a part of the interconnector. The solid oxide fuel cell stack thus obtained was evaluated as follows. The results are shown in Table 2.

Comparative Example B3

A solid oxide fuel cell stack was obtained in the same manner as in Example B1, except that the insulating member 310c and the insulating member (310a and 310b) were not provided. The solid oxide fuel cell stack thus obtained was evaluated as follows. The results are shown in Table 2.

Evaluation

The measurement of OCV, the measurement of critical fuel utilization factor, and the measurement of terminal voltage were carried out in the same manner as described above. The results are shown in Table 2.

TABLE 2

|  | Insulating member 310c | Insulating member 310a + 310b | Interconnector covered | OCV | Critical fuel utilization factor | Terminal voltage |
|---|---|---|---|---|---|---|
| Example B1 | Provided | Provided | Provided | 1.14 V | 69% | 0.69 V |
| Example B2 | Provided | Not | Provided | 1.13 V | 66% | 0.66 V |

TABLE 2-continued

|  | Insulating member 310c | Insulating member 310a + 310b | Interconnector covered | OCV | Critical fuel utilization factor | Terminal voltage |
|---|---|---|---|---|---|---|
| Comparative Example B1 | Provided | provided Provided | Not provided | 1.14 V | 69% | 0.59 V |
| Comparative Example B2 | Not provided | Not provided | Not provided | 1.10 V | 52% | 0.55 V |
| Comparative Example B3 | Not provided | Not provided | Provided | 0.02 V | Immeasurable | Immeasurable |

What is claimed is:

1. A solid oxide fuel cell stack comprising:
a support; and
a plurality of power generation elements provided on a surface of the support, wherein:
when two adjacent power generation elements in the plurality of power generation elements are a first power generation element and a second power generation element, respectively,
the first power generation element comprises
a first fuel electrode,
a first air electrode, and
a first solid electrolyte provided between the first fuel electrode and the first air electrode,
the first fuel electrode being provided between the support and the first air electrode,
the second power generation element comprises
a second fuel electrode,
a second air electrode, and
a second solid electrolyte provided between the second fuel electrode and the second air electrode,
the second fuel electrode being provided between the support and the second air electrode,
the solid oxide fuel cell stack further comprises an interconnector that electrically connects the first air electrode to the second fuel electrode,
the first power generation element is connected in series with the second power generation element through the interconnector,
when a vertical direction from the surface of the support to the first fuel electrode, the first solid electrolyte, and the first air electrode or a vertical direction from the surface of the support to the second fuel electrode, the second solid electrolyte, and the second air electrode is considered to be a Z axis direction,
the two adjacent power generation elements include
a second area of the first power generation element, the second area including the first solid electrolyte and the first air electrode arranged in that order in the Z axis direction,
a third area of the first power generation element, the third area including the first fuel electrode, the first solid electrolyte, and the first air electrode arranged in that order in the Z axis direction, and
a sixth area of the first power generation element, the sixth area including the second fuel electrode, the interconnector, and the first air electrode arranged in that order in the Z axis direction,
when a direction that is perpendicular to the Z axis direction and in which oxide ions migrate is considered to be an X axis direction,
the third area, the second area, and the sixth area are continuously adjacent in that order in the X axis direction, and
the solid oxide fuel cell stack further includes an insulating member provided in contact with the interconnector, and the insulating member includes,
in the second area, a first portion provided between the first solid electrolyte and the first air electrode, and
the whole area of a surface of the interconnector is covered with the first air electrode.

2. The solid oxide fuel cell stack according to claim 1, wherein a relationship of L'/L≥2 is satisfied, wherein L represents a length in the Z axis direction from an upper surface of the first fuel electrode to a lower surface of the first air electrode in the first solid electrolyte arranged in the third area; and L' represents the total of a length of a portion where the first portion in the insulating member is in contact with the first solid electrolyte, and a length of a portion where the second portion in the insulating member is in contact with the first solid electrolyte.

3. The solid oxide fuel cell stack according to claim 2, wherein the relationship of L'/L≤50 is satisfied.

4. The solid oxide fuel cell stack according claim 1, wherein
the two adjacent power generation elements further include a fourth area of the first power generation element, the fourth area including the second fuel electrode, the second solid electrolyte, and the first air electrode arranged in that order in the Z axis direction,
the fourth area is continuously adjacent to the sixth area in the X axis direction, and
the insulating member includes, in the fourth area, a third portion provided between the second solid electrolyte and the first air electrode.

5. The solid oxide fuel cell stack according to claim 4, wherein
the two adjacent power generation elements further include a fifth area of the second power generation element, the fifth area including the second fuel electrode and the second solid electrolyte arranged in that order in the Z axis direction,
the fourth area and the fifth area are continuously adjacent in that order in the X axis direction, and
the insulating member further includes, in a part or the whole of the fifth area in the X axis direction, a fifth portion provided on the second solid electrolyte and adjacent in the X axis direction to the third portion.

6. The solid oxide fuel cell stack according to claim 4, wherein
the two adjacent power generation elements further include a third area of the second power generation element, the third area including the second fuel electrode, the second solid electrolyte, and the second air electrode arranged in that order in the Z axis direction,
the fifth area and the third area continuously adjacent in that order in the X axis direction, and the insulating member further includes, in a part in the X axis direction of the third area, a fourth portion provided between the second solid electrolyte and the second air electrode and adjacent to the fifth portion in the X axis direction.

7. A solid oxide fuel cell stack comprising:
a support; and
a plurality of power generation elements provided on a surface of the support, wherein:
when two adjacent power generation elements in the plurality of power generation elements are a first power generation element and a second power generation element, respectively,
the first power generation element comprises
a first fuel electrode,
a first air electrode, and
a first solid electrolyte provided between the first fuel electrode and the first air electrode,
the first fuel electrode being provided between the support and the first air electrode,
the second power generation element comprises
a second fuel electrode,
a second air electrode, and
a second solid electrolyte provided between the second fuel electrode and the second air electrode,
the second fuel electrode being provided between the support and the second air electrode,
the solid oxide fuel cell stack further comprises an interconnector that electrically connects the first air electrode to the second fuel electrode,
the first power generation element is connected in series with the second power generation element through the interconnector,
when a vertical direction from the surface of the support to the first fuel electrode, the first solid electrolyte, and the first air electrode or a vertical direction from the surface of the support to the second fuel electrode, the second solid electrolyte, and the second air electrode is considered to be a Z axis direction,
the two adjacent power generation elements include
a second area of the first power generation element, the second area including the first solid electrolyte and the first air electrode arranged in that order in the Z axis direction,
a third area of the first power generation element, the third area including the first fuel electrode, the first solid electrolyte, and the first air electrode arranged in that order in the Z axis direction, and
a sixth area of the first power generation element, the sixth area including the second fuel electrode, the interconnector, and the first air electrode arranged in that order in the Z axis direction,
when a direction that is perpendicular to the Z axis direction and in which oxide ions migrate is considered to be an X axis direction,
the third area, the second area, and the sixth area are continuously adjacent in that order in the X axis direction, and
the solid oxide fuel cell stack further includes an insulating member provided in contact with the interconnector, and the insulating member includes,
in the second area, a first portion provided between the first solid electrolyte and the first air electrode,
the whole area of a surface of the interconnector is covered with the first air electrode, and
the interconnector is formed of a perovskite oxide represented by $Sr_aLa_bTi_{1-c-d}A_cB_dO_{3-\delta}$ wherein A represents one or more elements selected from Nb, V, and Ta; B represents one or more elements selected from Fe and Co; and a, b, c, and d are positive real numbers that respectively satisfy $0.1 \leq a \leq 0.8$, $0.1 \leq b \leq 0.8$, $0.1 \leq c \leq 0.3$, and $0.3 \leq d \leq 0.6$.

8. The solid oxide fuel cell stack according to claim 1, wherein the insulating member contains at least one material selected from $Sr_xLa_yTiO_{3-\delta}$ wherein x and y are real numbers that satisfy $0.8 \leq x+y \leq 1.0$ and $0 \leq y \leq 0.01$, $TiO_2$, forsterite ($Mg_2SiO_4$), MgO, $Al_2O_3$, $SiO_2$, and $Y_2O_3$.

9. The solid oxide fuel cell stack according to claim 7, wherein the insulating member contains at least one material selected from $Sr_xLa_yTiO_{3-\delta}$ wherein x and y are real numbers that satisfy $0.8 \leq x+y \leq 1.0$ and $0 \leq y \leq 0.01$, $TiO_2$, forsterite ($Mg_2SiO_4$), MgO, $Al_2O_3$, $SiO_2$, and $Y_2O_3$.

10. The solid oxide fuel cell stack according to claim 1, wherein the insulating member has an electrical insulating property and an oxide ion insulating property.

* * * * *